United States Patent
Cheng et al.

(10) Patent No.: US 12,450,729 B2
(45) Date of Patent: Oct. 21, 2025

(54) THRESHOLD AND MODEL ADAPTATION FOR THE kNN-BASED ANOMALY DETECTION METHOD

(71) Applicant: FANUC CORPORATION, Yamanashi (JP)

(72) Inventors: Yujiao Cheng, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 327 days.

(21) Appl. No.: 18/330,477

(22) Filed: Jun. 7, 2023

(65) Prior Publication Data

US 2024/0412348 A1    Dec. 12, 2024

(51) Int. Cl.
| | |
|---|---|
| *G06T 7/00* | (2017.01) |
| *G06N 3/0464* | (2023.01) |
| *G06N 3/09* | (2023.01) |
| *G06V 10/40* | (2022.01) |
| *G06V 10/75* | (2022.01) |
| *G06V 10/764* | (2022.01) |

(Continued)

(52) U.S. Cl.
CPC ........... *G06T 7/001* (2013.01); *G06N 3/0464* (2023.01); *G06N 3/09* (2023.01); *G06V 10/40* (2022.01); *G06V 10/751* (2022.01); *G06V 10/764* (2022.01); *G06V 10/776* (2022.01); *G06V 10/82* (2022.01); *G06T 2207/20084* (2013.01); *G06T 2207/30108* (2013.01)

(58) Field of Classification Search
CPC ........... G06T 7/001; G06T 2207/30108; G06T 2207/20084; G06V 10/40; G06V 10/82; G06V 10/751; G06V 10/776; G06V 10/764; G06N 3/09; G06N 3/0464

USPC ......................................................... 382/141
See application file for complete search history.

(56) References Cited

U.S. PATENT DOCUMENTS

| | | | |
|---|---|---|---|
| 8,800,036 B2 | 8/2014 | Khayam et al. | |
| 9,038,172 B2 | 5/2015 | Miller et al. | |
| 2017/0279848 A1* | 9/2017 | Vasseur ................. | H04W 12/02 |

(Continued)

OTHER PUBLICATIONS

Cohen, Niv, and Hoshen, Yedid; "Sub-Image Anomaly Detection with Deep Pyramid Correspondences." School of Computer Science and Engineering, The Hebrew University of Jerusalem, Israel; 2020.

(Continued)

*Primary Examiner* — Allen H Nguyen
(74) *Attorney, Agent, or Firm* — John A. Miller; Shumaker, Loop & Kendrick, LLP

(57) ABSTRACT

A method for anomaly detection from object images. A feature extractor provides feature data characterizing part images, including good parts and bad parts. Training data for good parts is used to create a k-nearest neighbors (k-NN) model core set. Adaptation data for some good and some bad parts is evaluated by a k-NN module to determine an anomaly score from the feature data. A good-vs-bad threshold for the anomaly score is initially set to a low value. When an anomaly score over the threshold is detected, a human inspects the corresponding image to determine whether the subject part is good or bad. If the part is good and the anomaly was false, the k-NN model core set is updated to include the feature data for the subject part, and the threshold is adjusted higher. After every adaptation, the k-NN model is applied to a test data set to evaluate performance.

20 Claims, 15 Drawing Sheets

(51) Int. Cl.
  *G06V 10/776* (2022.01)
  *G06V 10/82* (2022.01)

(56) References Cited

U.S. PATENT DOCUMENTS

2020/0285737 A1* 9/2020 Kraus .................. G06F 21/552
2020/0285997 A1* 9/2020 Bhattacharyya ......... G06N 7/01
2023/0281959 A1* 9/2023 Hoshen ................. G06N 3/045
  382/225

OTHER PUBLICATIONS

Roth, Karsten, et al. "Towards Total Recall in Industrial Anomaly Detection." Proceedings of the IEEE/CVF Conference on Computer Vision and Pattern Recognition; 2022.
Eskin, Eleazar, et al. "A Geometric Framework for Unsupervised Anomaly Detection." Applications of data mining in computer security. Springer, Boston, MA, 2002. 77-101.
Chen, Yingjun, and Hao, Yongtao "A Feature Weighted Support Vector Machine and K-Nearest Neighbor Algorithm for Stock Market Indices Prediction." Expert Systems with Applications 80 (2017): 340-355.
Bagi, Yufika Sari, and Suprapto, S. "Hepatitis Diagnosis Using Case-Based Reasoning with Gradient Descent as Feature Weighting Method." Journal of Information Systems Engineering and Business Intelligence Intell 4.1 (2018): 25.

* cited by examiner

THRESHOLD AND MODEL ADAPTATION FOR THE kNN-BASED ANOMALY DETECTION METHOD

BACKGROUND

Field

The present disclosure relates generally to an adaptive method for anomaly detection and, more particularly, to a method for anomaly detection which uses a feature extractor in conjunction with a k-nearest neighbors (k-NN) scoring technique, where a model of good object data and a threshold dividing good object scores from anomaly scores are updated during an adaptation phase in order to simultaneously improve both the number of missed anomaly detections and the number of false anomaly alarms.

Discussion of the Related Art

In many industries, parts or other objects must be inspected-including inspection for proper fit and/or finish, surface quality, etc. In recent years, these types of inspections have often been performed by computer-based image analysis systems rather than manually by a human inspector. In a typical computer-based image analysis application, images of objects are provided to a computer running an algorithm which performs anomaly detection on the image of each object.

Anomaly detection systems often include a feature extractor—such as a machine learning system which takes an image as input and provides as output a set of feature vectors which characterize the image. The feature extractor dramatically reduces the amount of data required for anomaly detection—by replacing an image having millions of pixels with a set of numerically-defined feature vectors which may number in the hundreds.

After feature extraction, a separate algorithm or calculation is used to evaluate the feature vector data in order to provide an anomaly score. One effective technique for determining an anomaly score from the feature data is known as k-nearest neighbors (k-NN). The k-NN technique is a supervised learning method where a property value is determined from the "k" closest training examples in a data set. When applied to anomaly detection, the data set contains feature vector data for the training samples and the property value provided by k-NN is the anomaly score.

A fundamental challenge in anomaly detection is data imbalance between input data representing "good" objects and input data representing "bad" objects. That is, the number of good objects used to train the feature extractor typically far outweighs the number of bad objects. This can make it difficult for the feature extractor to construct a model which accurately distinguishes between characteristics of good and bad objects.

Techniques are known in the art which attempt to improve on the effectiveness of anomaly detection systems. These techniques range from simple adjustment of a threshold between good and bad scores, to adaptation of neural network classifiers, to one-at-a-time filter weighting in feature vector calculations. However, none of these existing techniques have proven to be flexible in adaptation and effective in improving anomaly detection results.

In view of the circumstances described above, improved methods are needed for adaptive and learning image-based anomaly detection.

SUMMARY

The following disclosure describes a method and system for anomaly detection from object images. A feature extractor neural network is used to provide feature data characterizing a plurality of images, including images of a large number of good parts and a small number of bad parts. Training data comprising the feature data for only good parts is used to create a k-nearest neighbors (k-NN) model core data set. Adaptation data comprising the feature data for some good parts and some bad parts is then evaluated by a k-NN module to determine an anomaly score from the feature data for each image. A good-vs-bad threshold for the anomaly score is initially set to a low value. When an anomaly score over the threshold is detected, a human inspector evaluates the corresponding image to determine whether the subject part is good or bad. If the part is good and the anomaly was a false alarm, the k-NN model data set is updated to include the feature data for the subject part, and the threshold is adjusted incrementally higher. After every adaptation, the k-NN model is applied to all parts in a test data set to evaluate performance.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a method for threshold and model adaptation in k-NN-based anomaly detection is merely exemplary in nature, and is in no way intended to limit the disclosed techniques or their applications or uses.

Figure 1:
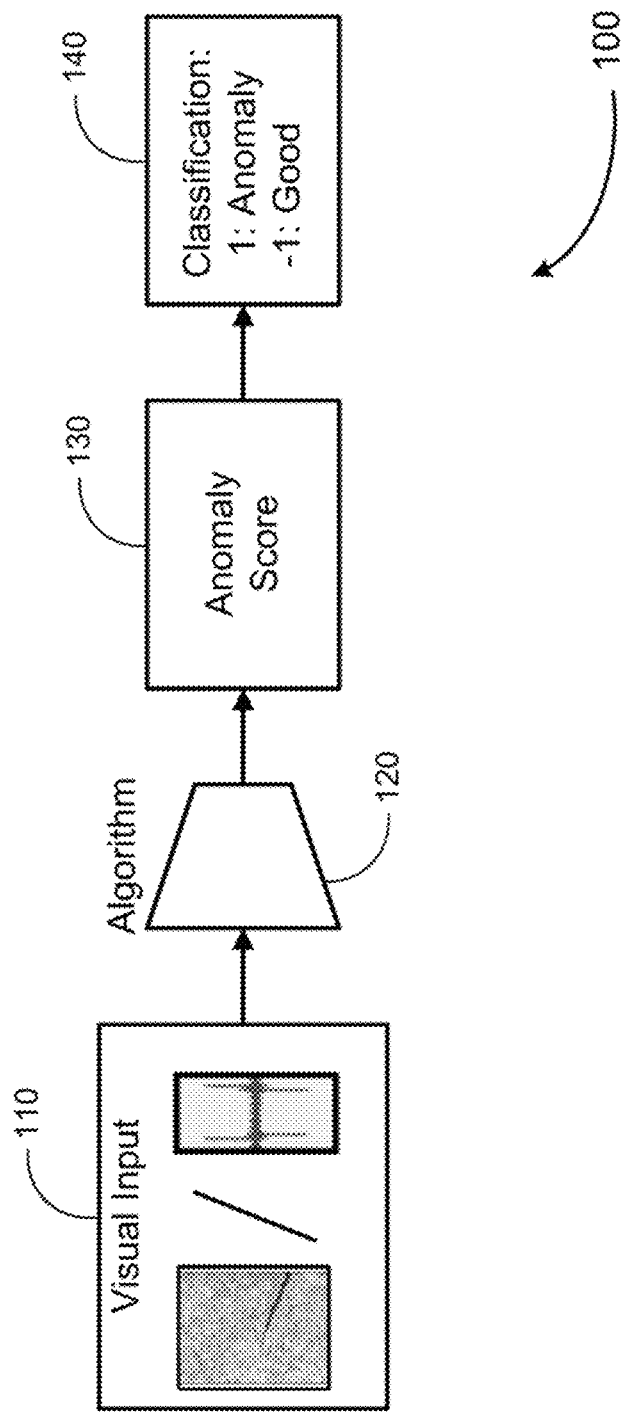
FIG. 1 is a block diagram illustration showing a basic architecture of an anomaly detection system, as known in the art.

FIG. 1 is a block diagram illustration showing a basic architecture of an anomaly detection system 100, as known in the art. At block 110, an input is provided. The input at the block 110 is typically a visual input, such as an image of a part or workpiece. In some applications, the input is a graphical or data input, such as data from an accelerometer or other sensor which characterizes the operation of a device. In any case, the input at the block 110 is used to determine whether the item being analyzed (the part or workpiece, or device) is normal (a.k.a., "good", "ok", "nominal") or an anomaly ("bad", "defect").

The input from the block 110 is provided to an algorithm 120 which determines an anomaly score 130. Based on the anomaly score 130, the item being analyzed is classified as either normal/good or anomaly/bad.

FIG. 1 is simply meant to illustrate the basic concepts and building blocks of anomaly detection systems, to set the stage for the further discussion below.

Figure 2:
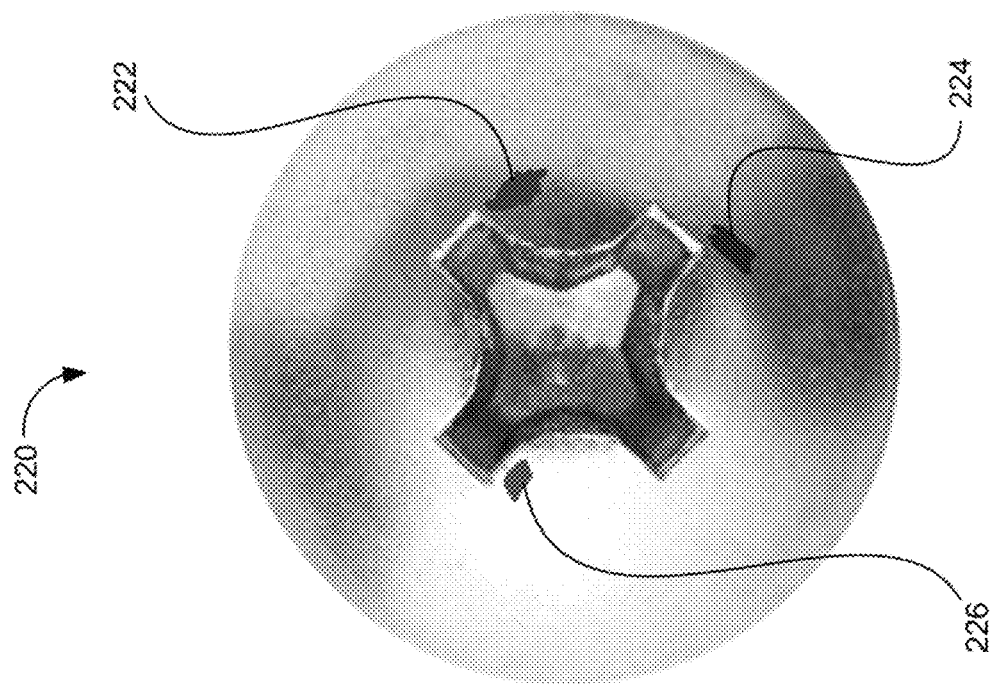
FIG. 2 is an illustration of parts to be visually inspected, including blemishes on one part which must be identified using an anomaly detection method and system.
Figure 2:
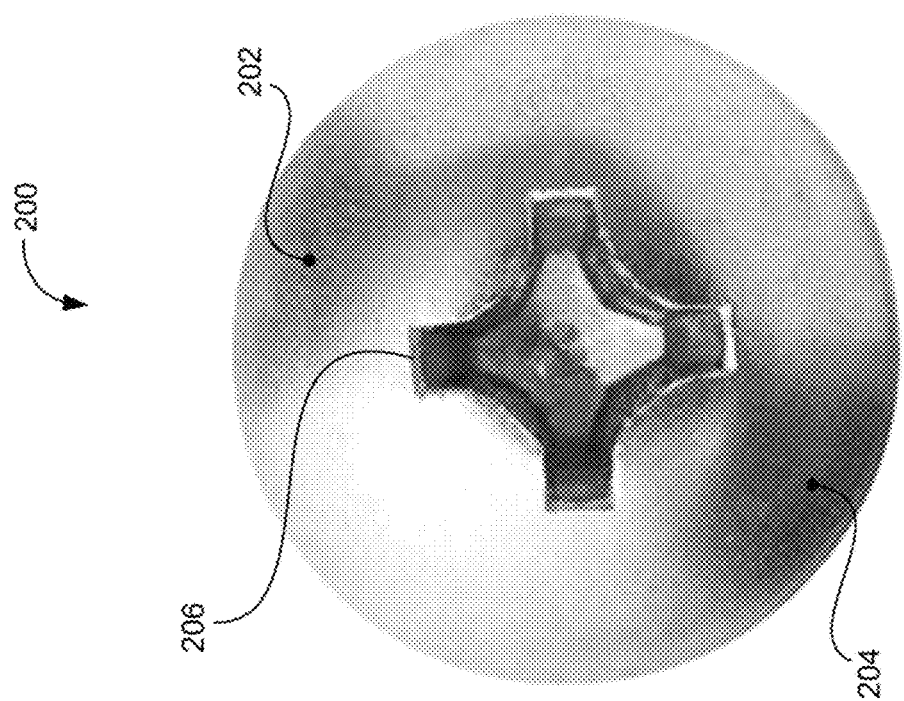

FIG. 2 is an illustration of parts to be visually inspected, including blemishes on one part which must be identified using an anomaly detection method and system. In the example of FIG. 2, the anomaly detection system is used to classify screw heads as either good or bad, based on an image of the screw head. The screw heads may have just been manufactured (such as on a header machine), or the screws may have just been installed into an assembly. In yet another scenario, the screws are part of an assembled product, and an electrical connectivity or performance test is conducted by bringing an external probe into contact with the screw head.

A screw head 200 at the left of FIG. 2 is a normal (good) part, having no blemishes which would cause it to be rejected as an anomaly. However, the image depicting the screw head 200 includes several characteristic portions which make the task of anomaly detection difficult. For example, shadows and reflections 202 and 204 are common in images, owing to imperfect lighting conditions, surrounding objects, camera angles, etc. With an object such as the screw head 200—having a shiny, non-flat surface—it is very difficult to provide an image which is completely devoid of shadows and reflections.

The screw head 200 also includes a recess 206, which in this case is shaped to receive a Phillips screwdriver bit. The recess 206 is obviously a necessary shape feature of the screw head 200, and not a defect or anomaly. However, the many surfaces and shadows and other characteristics of the recess 206 add a lot of complexity to the evaluation of the image of the screw head 200.

A screw head 220 at the right of FIG. 2 is an anomaly (bad) part, having several blemishes which should cause it to be rejected as an anomaly. The image of the screw head 220 includes the same shadows and reflections, and the same recess 206, as the image of the screw head 200. The image of the screw head 220 is rotated about 45° relative to the image of the screw head 200, which illustrates another difficulty associated with visual anomaly detection. That is, the shadows and reflections and other shape features may appear in different locations and orientations from one part to the next, so that a simple comparison of a new image to a known good part image is not sufficient to reliably detect anomalies.

The screw head 220 includes blemishes 222, 224 and 226. The blemishes 222-226 may be of one or more type—including scratches, flat spots or other defects from the screw header machine, or burn marks caused by arcing when the external electrical probe is brought into contact with the screw head 220. Any one of the blemishes 222-226 may be enough to cause the screw head 220 to be classified as an anomaly. Three different blemishes are included in order to illustrate that the blemishes may appear on different parts of the screw head 220, and in different locations relative to the shadows and reflections. The blemishes 222-226 themselves may also have different shapes, and different lightness/darkness and reflectivity characteristics.

FIG. 2 and the preceding discussion are included to provide further background for the anomaly detection discussion. In addition, the techniques of the present disclosure have been applied to screw head anomaly detection of a type similar to that depicted in FIG. 2. The effectiveness of the disclosed methods and systems is discussed later in the present disclosure.

Because of the complexities encountered in real-world anomaly detection, as discussed above, various techniques have been developed for anomaly detection having self-learning capability and advanced anomaly score analysis.

Figure 3:
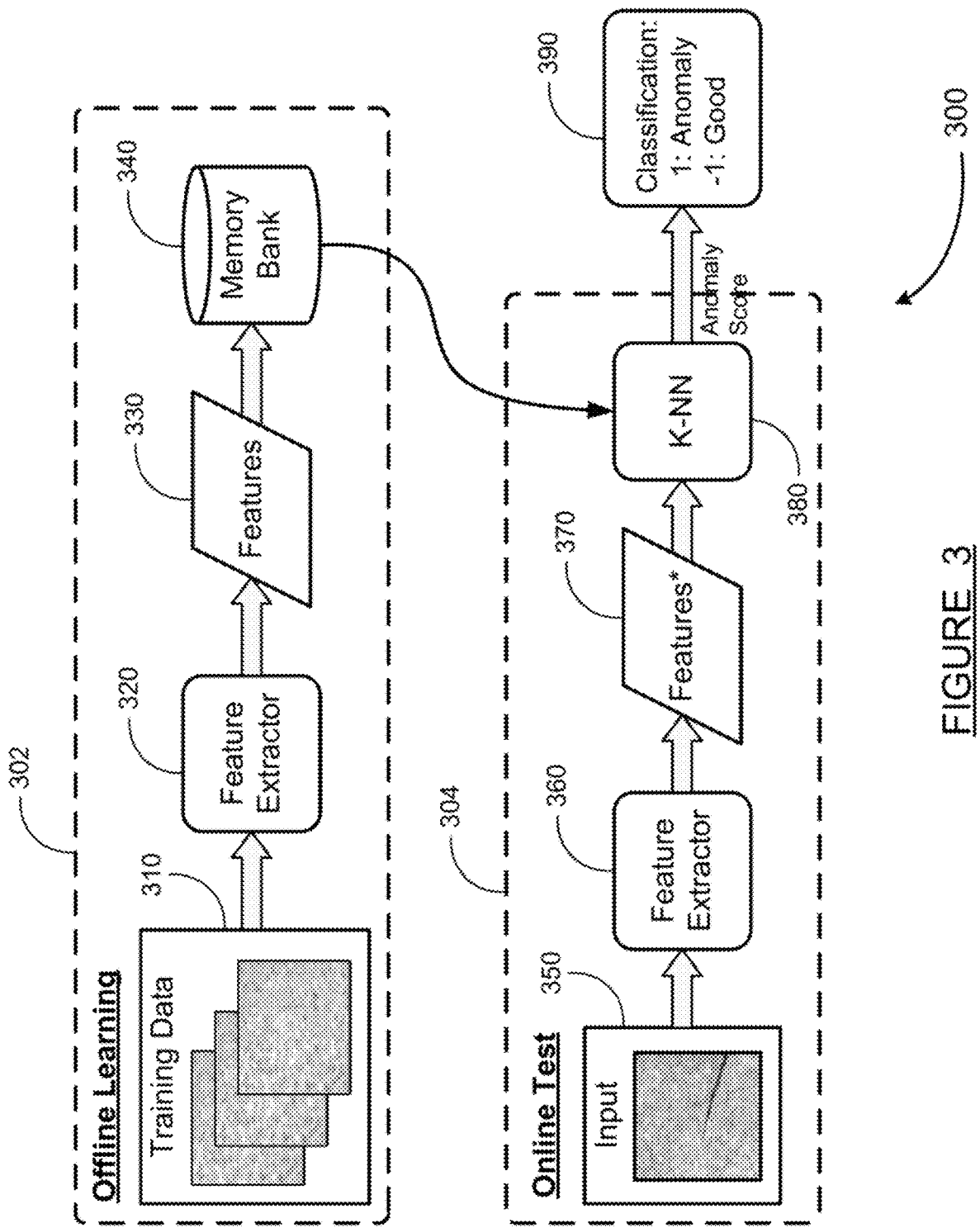
FIG. 3 is a block diagram illustration of an anomaly detection system having an offline learning section and an online test section, where the online test section includes a k-nearest neighbors (k-NN) module for determining an anomaly score from feature data, as known in the art.

FIG. 3 is a block diagram illustration of an anomaly detection system 300 having an offline learning section and an online test section, as known in the art. The system 300 includes an offline learning section 302 and an online test section 304. The offline learning section 302 is used to pre-train a database to recognize features of good parts, while the online test section 304 evaluates parts of unknown classification and includes a k-nearest neighbors (k-NN) module for determining an anomaly score from feature data.

In the offline learning section 302, training data 310 is provided, where the training data 310 includes images for parts of known classification (good or anomaly). Each image in the training data 310 may be of any of the types discussed above, or others—such as images of the screw heads, images of a painted surface to determine paint finish quality, etc. Each image in the training data 310 is provided to a feature extractor module 320, which may be a convolutional neural network (CNN) which extracts feature vectors from the images, as known in the art. Features 330 are used to build a memory bank 340 which distinguishes good parts from anomaly parts, as the features 330 are identified as being extracted from good parts or anomaly parts in the training data 310. In some applications, only good parts are provided in the training data 310.

In the online test section 304, input 350 includes a plurality of images from parts which are typically of unknown classification (good or anomaly). Each image from the input 350 is provided to a feature extractor module 360, which may be the same CNN-based feature extractor module 320 as in the offline learning section 302. Features 370 are provided from the feature extractor module 360 for each image. The * in the element 370 is simply to indicate that the features 370 are different from the features 330, as the input 350 is different from the training data 310. The features 370 are provided to a k-NN module 380 which determines an anomaly score based on the features 370 for each individual part. The k-NN module 380 compares the features 370 for each part to the memory bank 340 which was pre-trained in the offline learning section 302. The anomaly score for each part is determined by the k-NN module 380 based on the "distance" (in feature vector space) between the features for the part and the features for the core set of good parts in the memory bank 340. A part with features which closely match the core set (i.e., a very small distance) will have an anomaly score close to zero. A part with features which do not closely match the core set (i.e., a large distance) will have a high anomaly score—such as greater than one.

A final part classification is provided at block 390. The final classification is typically either a −1 (for a good part) or a 1 (for a bad or anomaly part). Criteria for assigning the final classification value based on the anomaly score, usually by comparison to a threshold, vary by application.

The system 300—even with its relatively sophisticated feature extractor module and k-NN-based anomaly score determination—still has difficulty distinguishing between good parts and anomaly parts in all cases. In most anomaly detection applications, there are many parts which are clearly good, having a low anomaly score, and a few parts which are clearly bad, having a high anomaly score. However, there are typically some parts that receive an anomaly score (e.g., 0.95, or 1.02) which is near to a cut-off value or threshold (e.g., 1.0), where it is unclear if these parts are good or bad.

The difficulty in reliably detecting anomalies in existing systems such as the system 300 of FIG. 3 is partly because of the real-world complications illustrated in FIG. 2 and discussed above. It is also due to the fact that the distribution of good data in the input 350 (during online test) is sometimes different from the distribution of good data in the training data 310 (during offline learning). For example, some features of the good data in the online testing phase may never occur in the offline training phase. Thus, the pre-training which occurs in the offline learning section 302 is inevitably incomplete.

The techniques of the present disclosure have been developed to overcome the limitations of existing anomaly detection methods and systems-including those such as the system 300 of FIG. 3 discussed above.

A first technique for overcoming the limitations of existing anomaly detection methods and systems is threshold and model adaptation. Threshold and model adaptation directly addresses the problems of the system 300 discussed above—that is, the inability of the training data to adequately and accurately represent a complete set of the features of the good parts.

Figure 4A:
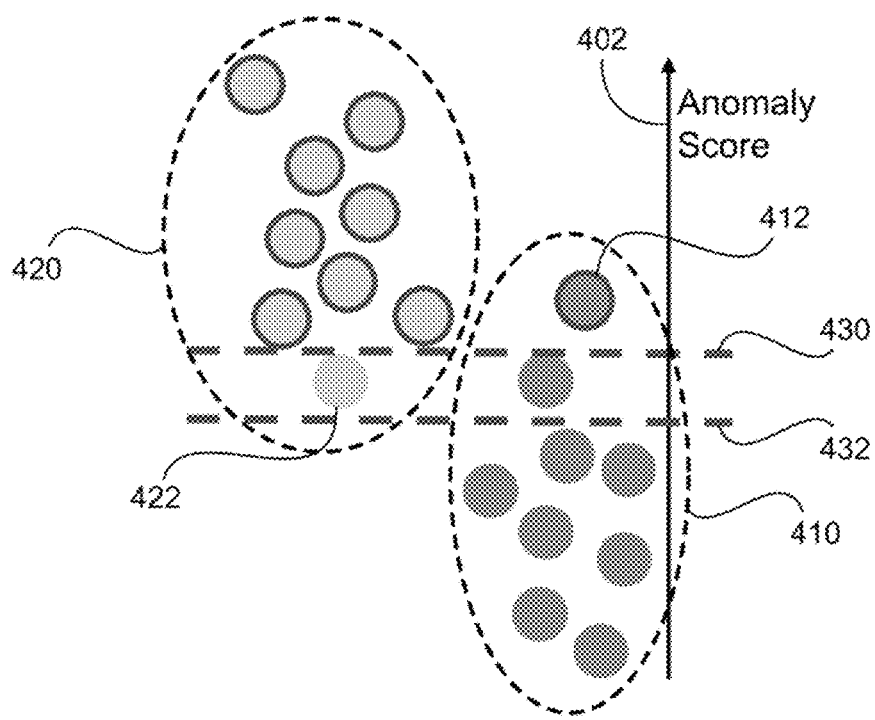
FIGS. 4A and 4B are illustrations of feature data clusters depicting the concepts of threshold and model adaptation, respectively, in k-NN-based anomaly detection, according to embodiments of the present disclosure.
Figure 4B:
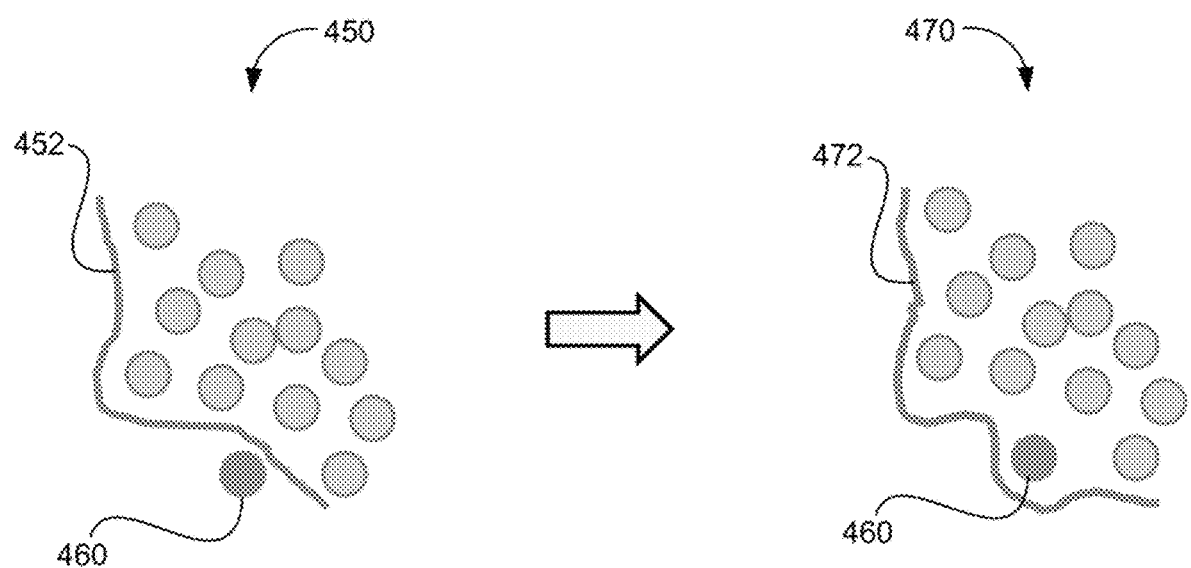

FIGS. 4A and 4B are illustrations of feature data clusters depicting the concepts of threshold and model adaptation, respectively, in k-NN-based anomaly detection, according to embodiments of the present disclosure. In FIG. 4A, a plurality of feature data points are depicted in locations according to an anomaly score, plotted on a vertical axis 402. An ellipse 410 contains feature data points for items (parts, or input images) which have been determined (such as through human inspection) to be good. An ellipse 420 contains feature data points for items (parts, or input images) which have been determined to be bad (anomalies or defects).

A threshold line 430 is an initial threshold used to distinguish between good and bad parts in the k-NN anomaly score evaluator. That is, points having an anomaly score over the threshold are classified as bad (anomaly), and vice versa. Using the threshold line 430, a feature point 412 is wrongly classified as an anomaly, as this point is known to belong to a good part. This situation is known as a false anomaly classification. Furthermore, using the threshold line 430, a feature point 422 is wrongly classified as a good part, when this point is known to belong to a bad/anomaly part. This is known as a missed anomaly detection. While both false anomalies and missed detections are undesirable, it is often established as a criteria of anomaly detection systems that no missed anomaly detections are acceptable (i.e., no bad parts are allowed to pass through undetected).

In order to eliminate the missed detection of the point 422, a new, lower threshold line 432 is established. The threshold line 432 does in fact eliminate all missed detections in the data set shown in FIG. 4A, but the lower threshold worsens the problem of false anomaly classifications, as another feature data point from a good part is now above the threshold line 432. FIG. 4A illustrates an important lesson regarding k-NN-based anomaly detection; that is, threshold adjustment alone cannot overcome the interrelated problems of false anomaly classification and missed detection of anomalies.

In FIG. 4B, a model 450 (at left) depicts a plurality of feature data points for good parts, along with a feature data point 460 for a part which was classified as an anomaly. A boundary line 452 defines the boundary around a core set of good part feature points (good part feature points are inside the boundary line 452, which is to the right of the line 452 in the figure, as only a portion of the model 450 is shown). Although the feature data point 460 was classified as an anomaly, it is close to the core set of good parts in the model 450.

If the part or image associated with the feature data point 460 is determined (such as through human inspection) to be a good part, not an anomaly, then adaptation of the model 450 may be called for. At the right, a model 470 is defined by a boundary line 472. The model 470 is an adaptation of the model 450 which includes the feature point 460 in the core set of good parts. This adaptation is illustrated here as simply redrawing the boundary line; however, techniques are described below for continuously and incrementally adapting the feature points which are included in a model core set, including eliminating feature points from the core set when new points are added. In the techniques described below, model adaptation and threshold adaptation are combined in a manner which dramatically improves anomaly detection performance.

FIGS. 4A and 4B (and later figures) are drawn in two dimensions for simplicity in discussing the concepts involved. As would be understood by those familiar with feature extraction, each feature "point" is actually a feature vector having a dimension which may be in the hundreds, and the calculations of location and distance between points are actually carried out in vector space, not two-dimensional space.

The threshold and model adaptation techniques of the present disclosure use human inspection in conjunction with specially-designed computation logic in order to incrementally adapt both a k-NN model core set and a threshold value in an anomaly detection system. These techniques are discussed in detail below.

Figure 5:
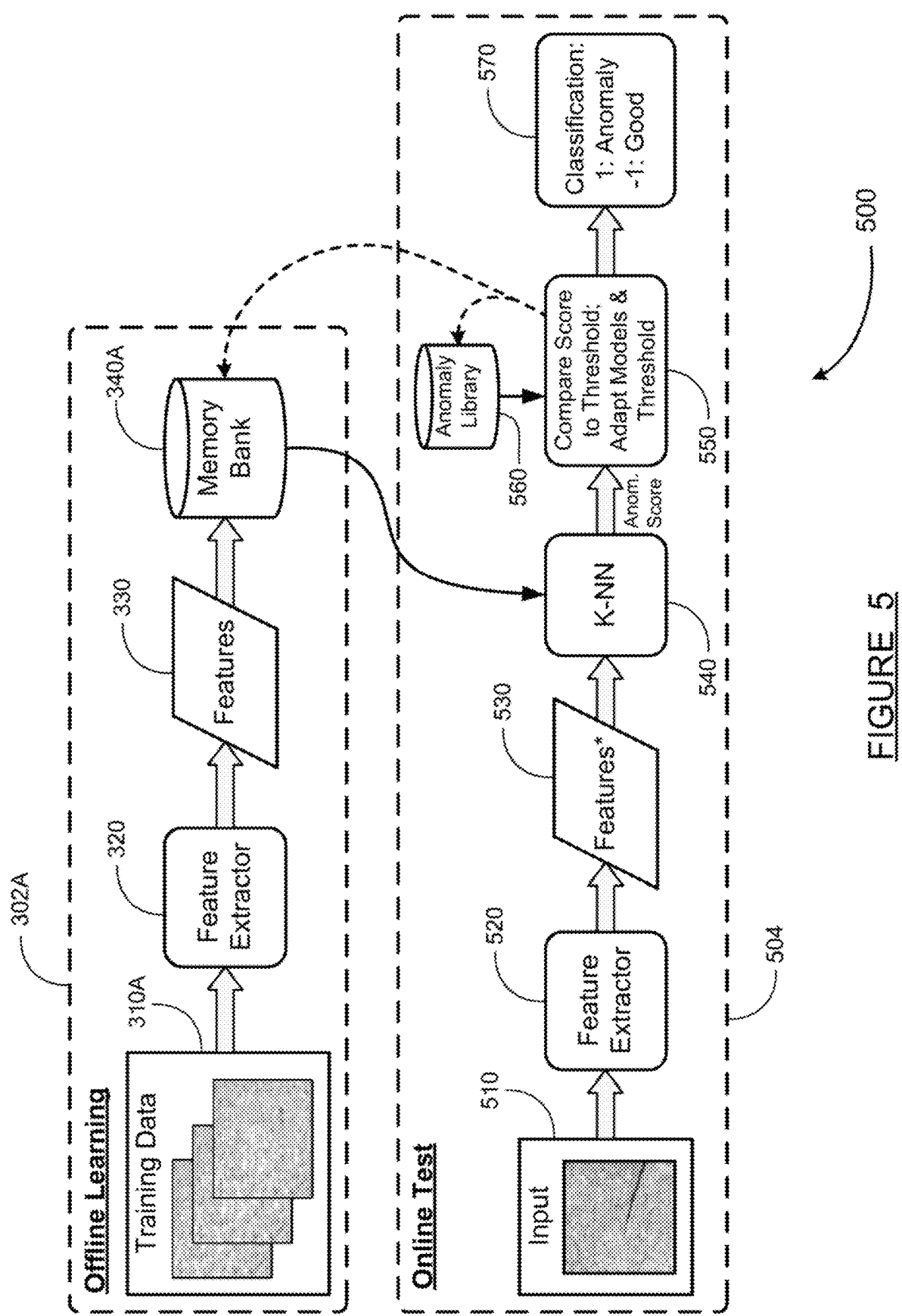
FIG. 5 is a block diagram illustration of a k-NN-based anomaly detection system including threshold and model adaptation during online test data processing, according to embodiments of the present disclosure.

FIG. 5 is a block diagram illustration of a k-NN-based anomaly detection system 500 including threshold and model adaptation during online test data processing, according to embodiments of the present disclosure. The system 500 has an architecture that is generally similar to the system 300 of FIG. 3—including an offline learning section and an online test section. The system 500 adds threshold and model adaptation computations coupled with the k-NN anomaly score determination, as described below.

An offline learning section 302A is essentially the same as the offline learning section 302 of FIG. 3, where training data 310A is provided to a feature extractor module 320, and features 330 are included in a memory bank 340A. In a preferred embodiment, the training data 310A of the system 500 includes images only for good parts, with no bad/anomaly parts included. This is because the objective is to initially create the memory bank 340A with a core set of known good feature data, establish a low initial threshold, and adapt the memory bank 340A and the threshold during online test data processing.

In an online test section 504, input 510 includes a plurality of images from parts of unknown classification (i.e., unknown whether each part is good or anomaly). Each image from the input 510 is provided, one at a time, to a feature extractor module 520, which is preferably the same type of CNN-based feature extractor module as discussed earlier. Features 530 are provided from the feature extractor module 520 for each image. Again, the features 530 characterize parts of unknown classification—including both good parts and bad/anomaly parts. The features 530 are provided to a k-NN module 540 which determines an anomaly score based on the features for each individual part.

The k-NN module 540 compares the features 530 for each part to the memory bank 340A which was pre-trained in the offline learning section 302A. The anomaly score for each part is determined by the k-NN module 540 based on the "distance" (in feature vector space) between the features for the part and the features for the nearest neighbors in the core set of good parts in the memory bank 340A. A part with features which closely match the core set (i.e., a very small distance) will have a low anomaly score. A part with features which do not closely match the core set (i.e., a large distance) will have a high anomaly score—such as greater than one.

A threshold and model adaptation module 550 is added in the system 500. The threshold and model adaptation module 550 performs a set of evaluations and computations after each image's anomaly score is provided by the k-NN module 540. The functions performed by the threshold and model adaptation module 550 include determining whether an item with an anomaly score over the threshold is a false anomaly, updating the core set of good part features in the memory bank 340A, updating the threshold used for final part classification, and updating an anomaly library 560 which is used in the calculations. Dashed lines to the memory bank 340A and the anomaly library 560 indicate the adaptations and updates that are performed to these elements, while the value of the threshold is maintained within the threshold and model adaptation module 550 itself. Details of these evaluations and computations are discussed below in connection with FIGS. 6 and 7.

A final part classification is provided at block 570. The final classification is either a −1 (for a good part) or a 1 (for a bad or anomaly part). The final classification value is based on the anomaly score as compared to the threshold, where the model core set used by the k-NN module 540 to determine the score, and the threshold used to perform the final classification, both evolve as more images are processed by the threshold and model adaptation module 550.

In a preferred embodiment of the system 500, images for a relatively large number of good parts and a relatively small number of bad parts are used—such as hundreds of good part images and tens of bad part images. In one non-limiting embodiment, one-third of the good part images (and no bad part images) are used for the training data 310A in the offline learning section 302A, one-third of the good part images and half of the bad part images are used for adaptation in the input 510 of the online test section 504, and the final one-third of the good part images and other half of the bad part images are used for testing in the input 510 of the online test section 504. In this embodiment, after each adaptation step (one image is processed, and the threshold and model are adapted), the entire set of testing images is processed in order to evaluate the performance of the system 500.

Figure 6:
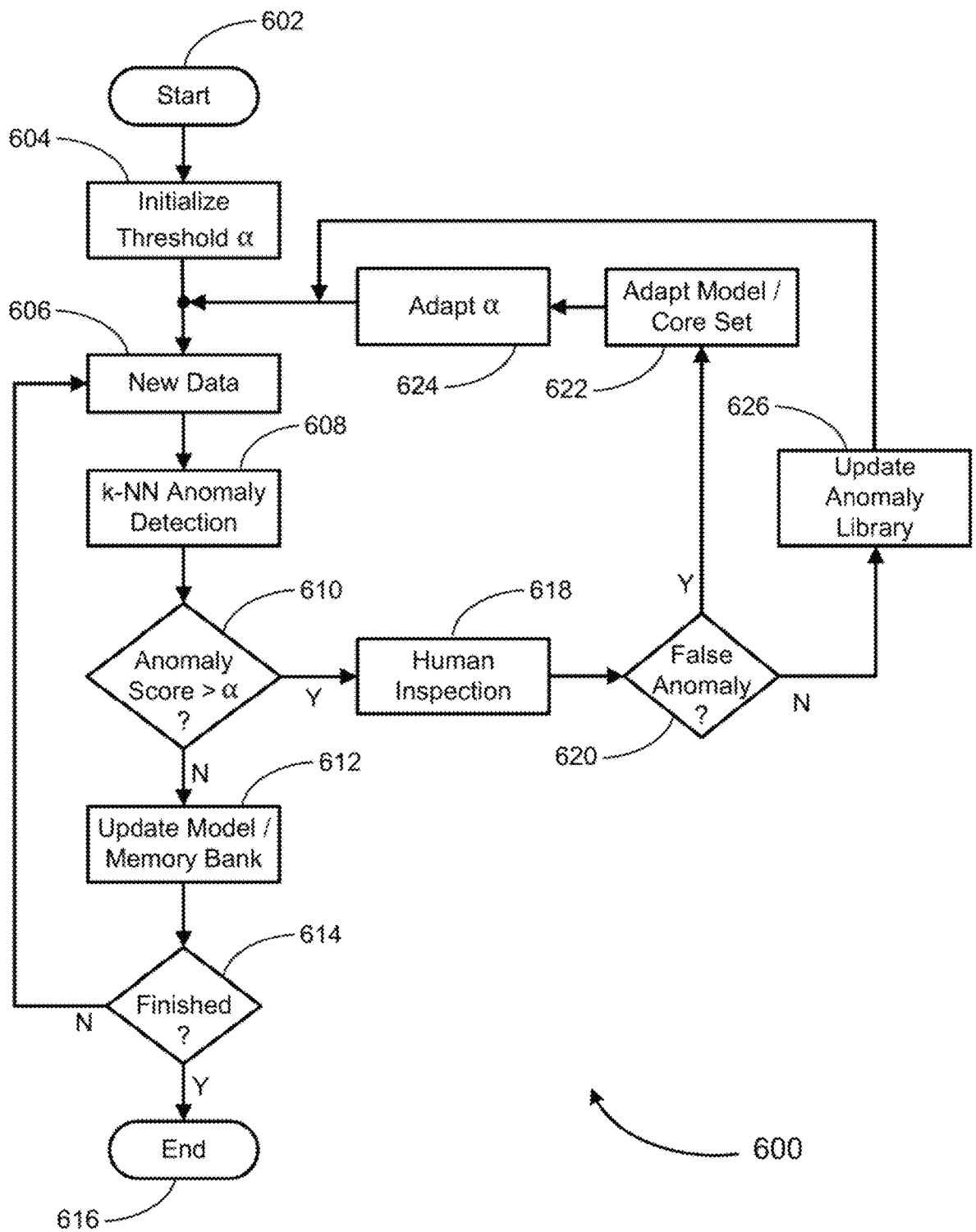
FIG. 6 is a flowchart diagram of a method for threshold and model adaptation in a k-NN-based anomaly detection system, according to embodiments of the present disclosure.

FIG. 6 is a flowchart diagram 600 of a method for threshold and model adaptation in a k-NN-based anomaly detection system, according to embodiments of the present disclosure. Following a start oval 602, at box 604 a threshold $\alpha$ is initialized. The threshold $\alpha$ is initialized after the online learning is performed using only good part data. That is, before adaptations begin using the online test section 504, the threshold $\alpha$ is initialized to a relatively low value (below 1.0). The idea is to initialize the threshold $\alpha$ is to a value which is high enough to allow most good parts to be classified as good, but low enough to ensure that all bad parts are classified as anomalies (no missed anomaly detections).

At box 606, new feature data (for a single image) is provided; this is the data in the features 530 of FIG. 5, provided to the k-NN module 540 which provides an anomaly score at box 608 based on comparison of the features to the model core set from the memory bank 340A. At decision diamond 610, it is determined whether the anomaly score is greater than the threshold $\alpha$. This determination and the remainder of the steps of FIG. 6 are performed in the threshold and model adaptation module 550 of FIG. 5. If the anomaly score is not greater than the threshold $\alpha$, then at box 612 the memory bank 340A is updated, which includes adding the features of the current (good) image to the model core set if certain criteria are met. The criteria include determining a distance from each feature point of the current feature set to a nearest feature point in the core set, and replacing an existing feature point with the feature point of the current feature set if the distance is greater than a minimum point-to-point distance of existing feature points in the core set. This is discussed further below and illustrated in FIG. 8.

From the decision diamond 610, if the anomaly score is greater than the threshold α, indicating an anomaly, then at box 618 a human inspects the part or image corresponding with the current feature data. The human inspector classifies the part image as either good or bad (anomaly). If the human inspector classifies the part image as good, then at decision diamond 620 the image feature data is determined to be a false anomaly.

In the case of a false anomaly, the process moves to box 622 where the core set (of good part feature data) is adapted in the memory bank 340A. This involves evaluating the current feature data—which is known from human inspection to belong to a good part image—to determine whether to add the current feature data to the core set. This evaluation is described in detail with respect to FIGS. 7 and 8. After the model adaptation at the box 622, at box 624 the threshold α is adapted to an incrementally higher value. The threshold adaptation is also detailed in the discussion of FIG. 7.

If the human inspector determines that the part/image is actually an anomaly, this means that it is not a false anomaly, and from the decision diamond 620 the process moves to box 626 where the anomaly library 560 is updated to include the current feature data. The relevance of the anomaly library 560 in adaptively updating the threshold α is discussed below in connection with FIG. 7.

Following model and threshold adaptation at the boxes 622 and 624, or anomaly library update at the box 626, the process returns to the box 606 where new feature data is provided (for the next part image in the input 510). At the decision diamond 614, when no more parts remain to be analyzed, the process ends at terminus 616.

It was mentioned above that a set of adaptation data images are provided to the online test section 504 and, after each adaptation data image is processed, an entire set of test data images is processed to determine system anomaly detection performance. Therefore, the steps of FIG. 6 are only performed for adaptation data images, not for test data images. Thus, the system 500 of FIG. 5 is preferably configured with a "switch" which indicates whether the system is running in adaptation mode or in test mode. When the system is in adaptation mode, the threshold and model adaptation steps of FIG. 6 (and FIG. 7) are performed. When the system is in test mode, the module 550 simply classifies each part image based on its anomaly score in comparison to the current value of the threshold α.

Figure 7:
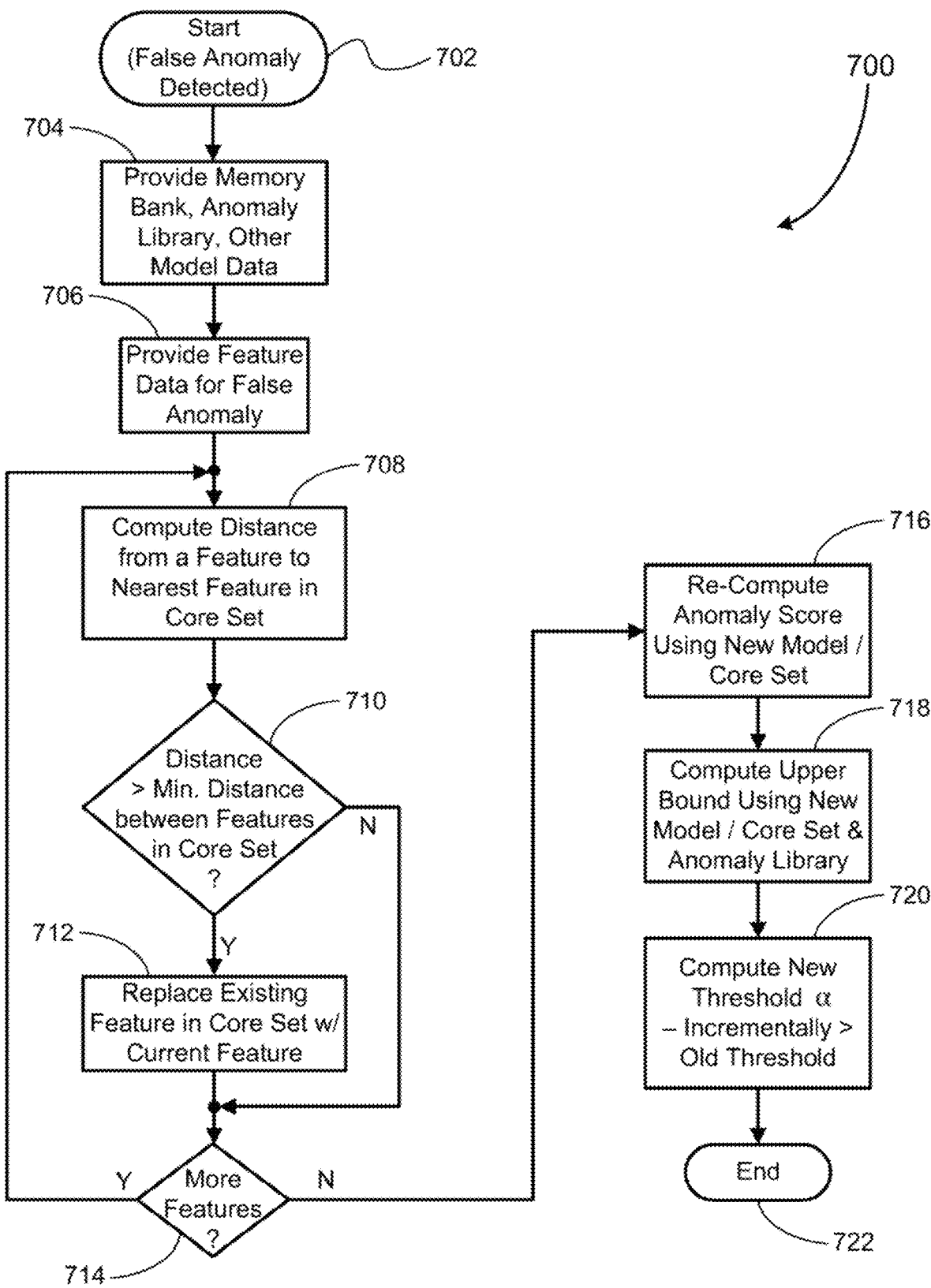
FIG. 7 is a flowchart diagram of a method for threshold and model adaptation during k-NN-based anomaly detection, including computations used to update a k-NN model core set and calculate a new threshold, according to embodiments of the present disclosure.

FIG. 7 is a flowchart diagram 700 of a method for threshold and model adaptation during k-NN-based anomaly detection, including computations used to update a k-NN model core set and calculate a new threshold, according to embodiments of the present disclosure. FIG. 7 and the accompanying discussion provide the details of the threshold and model adaptation calculation steps which were included in the method of FIG. 6.

The process begins at start oval 702 when a false anomaly is detected at the decision diamond 620 of FIG. 6. At box 704, data from the memory bank 340A is provided (containing the model core set M of good part feature data), along with the anomaly library 560 (containing anomaly/bad part feature data). Also at the box 704, a minimum distance vector d is provided which contains the minimum distances between feature vectors in the model core set M. Additionally, an increment step $l_r$ and a discount factor γ are provided at the box 704, where these parameters are used in threshold update calculations discussed below.

At box 706, feature data for the false anomaly part is provided. This is the part/image which had an anomaly score exceeding the threshold at the decision diamond 610, and was determined by the human inspector to be a good part, not an anomaly. The calculations being described here are performed in the threshold and model adaptation module 550 of FIG. 5. In one embodiment, the feature data comprises a set of 784 (a 28×28 grid) of feature vectors each having a dimension of 384. The exact composition of the feature data depends on the design of the feature extractor module 520, as would be understood by those skilled in the art.

Following the offline learning phase (see FIG. 5), the memory bank 340A includes a model core set M containing feature vectors for only good parts. The model core set M may initially contain the 784 feature vectors for each of several dozen (or a few hundred) part images, in which case the number of feature vectors could be in the hundreds of thousands. In order to reduce inference time in the online test phase, the model core set M may be downsampled to include a number of feature vectors on the order of $10^5$, rather than the initial number of feature vectors on the order of $10^6$. The downsampling may be performed in any suitable manner.

What happens next is that a determination is made whether to include one or more feature vectors from the current (false anomaly) part in the model core set M. The idea behind this is that the current false anomaly part had feature data which caused its anomaly score to be higher than the threshold, yet it is a good part as determined by human inspection. Therefore, there may be features of the current false anomaly part image which could be included in the model core set M in order to make the core set more robust to different image characteristics (recall the examples of FIG. 2). In a preferred embodiment, when a feature vector of the current false anomaly part is included in the model core set M, a feature vector is also removed from the model core set M, in order to maintain a constant core set size.

At box 708, for each of the feature vectors (e.g., all 784) of the current false anomaly part, a distance from the feature vector to a nearest feature vector in the model core set M is computed. At decision diamond 710, it is then determined whether the distance computed at the box 708 is greater than a minimum distance (provided in d) between feature vectors in the model core set M. If the answer is no, then the process moves ahead to decision diamond 714 where it loops back to the box 708 to compute the distance for the next feature vector.

If, at the decision diamond 710, the distance computed at the box 708 is greater than the minimum distance between feature vectors in the model core set M, then at box 712 one of the two feature vectors involved in the minimum distance is removed from the model core set M and replaced by the feature vector which is currently being calculated. The model core set M and the minimum distance vector d are then updated in the memory bank 340A.

Figure 8:
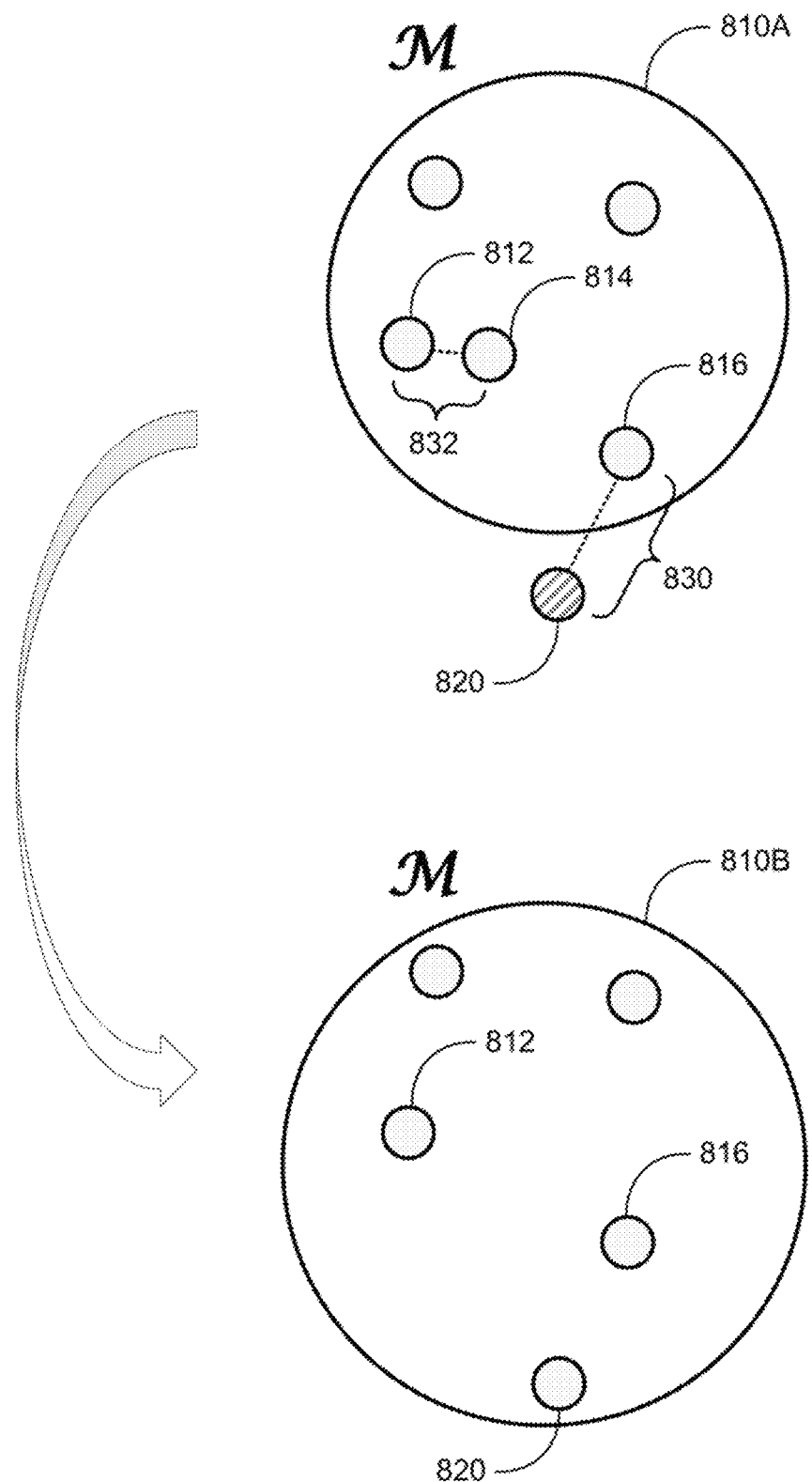
FIG. 8 is an illustration of a k-NN model core set and a false anomaly data point, depicting the computations used for updating the core set in the method of FIG. 7, along with the updated core set, according to embodiments of the present disclosure.

FIG. 8 is an illustration of a k-NN model core set M and a false anomaly data point 820, visually depicting the computations used for updating the core set M in the method of FIG. 7, according to embodiments of the present disclosure. The core set M indicated at 810A includes feature vectors ("points") 812, 814 and 816, among others. As discussed above, a distance 830 is calculated between the false anomaly feature vector (point) 820 and the nearest feature vector in the core set M, which is the feature vector 816. A distance 832 is the minimum distance between any pair of feature vectors in the core set M. All distances are calculated in feature vector space. Because the distance 830 is greater than the distance 832, the logic of FIG. 7 dictates that one of the feature vector points 812/814 is removed from the core set M and replaced with the feature vector 820.

At the bottom of FIG. 8, an updated core set 810B is shown, where the feature vector point 814 has been eliminated from the core set M and the feature vector 820 has been included in the core set M. Again, the purpose of this model core set adaptation is to increase the diversity of feature vectors (of known good parts) included in the core set M, which, along with the later threshold adaptation, reduces the number of false anomaly classifications.

In the manner described above, all of the feature vectors for the current false anomaly part are evaluated, and some may be included in the model core set M as replacements for closely-spaced core set feature vectors. This continues in the method of FIG. 7 until at the decision diamond 714 no more feature vectors exist for the current false anomaly part.

Then the process moves to box 716 to begin the steps involved in threshold adaptation based on the evaluation of the current false anomaly part. The steps of boxes 716-720 in FIG. 7 are performed in the box 624 of FIG. 6. At the box 716, a revised anomaly score s' is computed in the k-NN module 540 based on the feature vectors for the current false anomaly part and the revised model core set M from the memory bank 340A. At box 718, an upper bound score $s_u$ is computed in the k-NN module 540 based on all of the anomaly data in the anomaly library 560 compared against the revised model core set M from the memory bank 340A.

At box 720, a new value of the threshold α is computed which is incrementally higher than the previously existing value of the threshold α. The new value of the threshold α is computed at the box 720 as follows:

$$\alpha = \min(\max(s', \alpha) + \gamma \cdot l_r, s_u) \quad (1)$$

Where a first term is determined by choosing the higher of the revised anomaly score s' and the old value of the threshold α, and added to a second term which is calculated by multiplying the increment step $l_r$ by the discount factor γ. The lower of the sum of the terms and the upper bound score $s_u$ is selected as the new value of the threshold α. The logic embodied in Equation (1) is that the current false anomaly part is actually a good part, so if the revised anomaly score s' is greater than the old threshold value then the revised anomaly score s' is acceptable as a starting point for the new threshold value. Whether s' or α is chosen as the starting point, the term $\gamma \cdot l_r$ adds an incremental amount to the calculation of the new threshold value, and the new threshold value is capped by the upper bound score $s_u$.

After the threshold adaptation calculation at the box 720, the method of FIG. 7 ends at terminus 722. This corresponds with the method of FIG. 6 completing the box 624 and returning to process new data (data for another image from the input 510). Each time a false anomaly is encountered, the steps in the elements 618-624 of FIG. 6 are executed, along with the entirety of the threshold and model adaptation process of FIG. 7.

The preceding discussion of FIGS. 6-7 describes a number of evaluations and calculations performed in the process of threshold and model adaptation. With reference to the system block diagram of FIG. 5, it is to be understood that the various blocks and modules are all embodied in algorithms running on a processor (or multiple processors in communication with each other) such that the necessary data is available to each of the computing modules as needed for feature extraction, k-NN scoring, threshold and model adaptation, updating of the memory bank 340A and anomaly library 580, etc. This is visually depicted with the arrows in FIG. 5.

Figure 9:
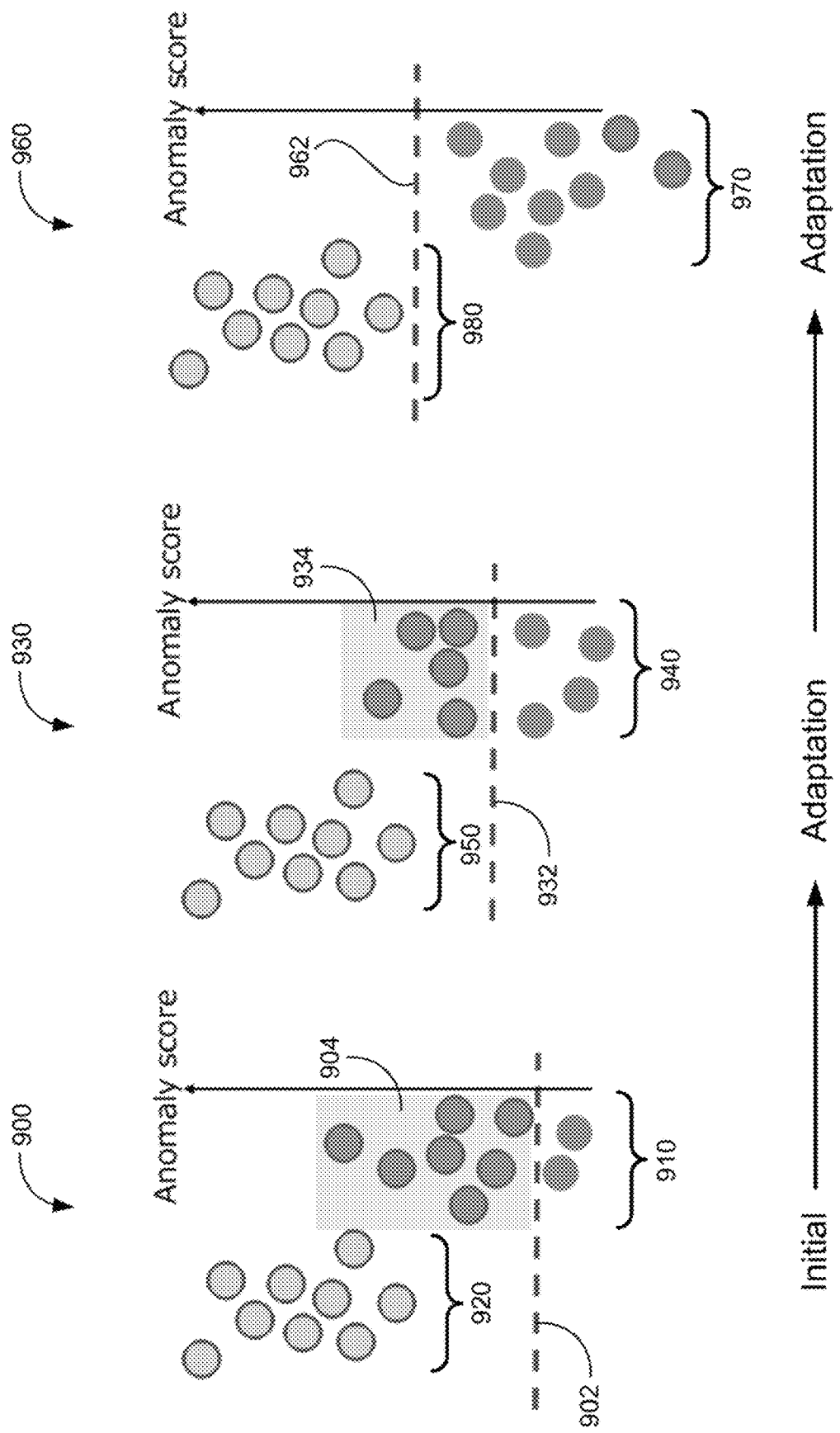
FIG. 9 is a series of illustrations of part anomaly scores from feature data depicting the effects of threshold and model adaptation in k-NN-based anomaly detection using the methods of FIGS. 6 and 7, where both false anomaly and missed detection performance are improved, according to embodiments of the present disclosure.

FIG. 9 is a series of illustrations of part anomaly scores from feature data depicting the effects of threshold and model adaptation in k-NN-based anomaly detection using the methods of FIGS. 6 and 7, where both false anomaly and missed detection performance are improved, according to embodiments of the present disclosure.

A set of feature vector points are shown in an initial scenario at 900 (at the left), with the points located according to their anomaly score plotted on a vertical axis. The feature vector points shown at 900 depict the results of sending a plurality of test data images through the system 500 after only the offline learning from the section 302A has been performed, and no adaptation has yet occurred. A set 910 contains feature data points for items (parts, or input images) which have been determined (such as through human inspection) to be good. A set 920 contains feature data points for items (parts, or input images) which have been determined to be bad (anomalies). A threshold line 902 has been set to a low value to prevent any missed anomaly detections. With the low threshold and no model adaptation, a large number of false anomalies are encountered, as shown in box 904.

After a certain number of adaptation data images are processed in the system 500, some adaptation of the threshold and model have occurred as shown in a scenario at 930. In the scenario 930, a set 940 contains the feature data points for good items from the set 910, where the data points have moved generally in the direction of lower anomaly scores due to model adaptation. A set 950 contains the same feature data points for bad items as in the set 920. Also in the scenario 930, a threshold line 932 has moved incrementally upward as a result of threshold adaptation. With the slightly higher threshold and some model adaptation, a smaller number of false anomalies are encountered, as shown in box 934. There are still no missed anomaly detections in the scenario 930, as the threshold adaptation includes computations, discussed above, limit the upward movement of the threshold in a manner which prevents missed detections.

After an additional number of adaptation data images are processed in the system 500, adaptations of the threshold and model have reached a final or near-final condition as shown in a scenario at 960. In the scenario 960, a set 970 contains the same feature data points for good items from the sets 910 and 940, where the data points have moved further in the direction of lower anomaly scores due to model adaptation. A set 980 contains the same feature data points for bad items as in the sets 920 and 950. Also in the scenario 960, a threshold line 962 has moved further upward as a result of threshold adaptation. With the higher threshold and additional model adaptation, no false anomalies are encountered in the scenario 960. Furthermore, there are still no missed anomaly detections in the scenario 960, for the reason mentioned above. It can be understood that the required amount of human inspection will drop off dramatically as the threshold and model adaptation take effect, and that eventually, all or nearly all of the parts classified as an anomaly will in fact be true anomalies.

The threshold and model adaptation techniques described above have been shown through experiments to provide separation between the sets of good and bad data points in an anomaly detection system, while simultaneously setting the threshold to an optimal value. These techniques deliver the ideal combination of anomaly detection results—zero missed anomaly detections, along with zero or near-zero false anomaly classifications. This ideal combination of results has not been possible with previously existing anomaly detection methods.

Another presently disclosed technique for overcoming the limitations of existing anomaly detection methods and systems is feature weighting. Feature weighting involves assigning weights to filters which are used to compute the distance between feature vectors when calculating anomaly scores, and optimizing the weights to achieve the best separation between good and bad data (e.g., part images). Details of the feature weighting techniques are discussed below.

Figure 10:
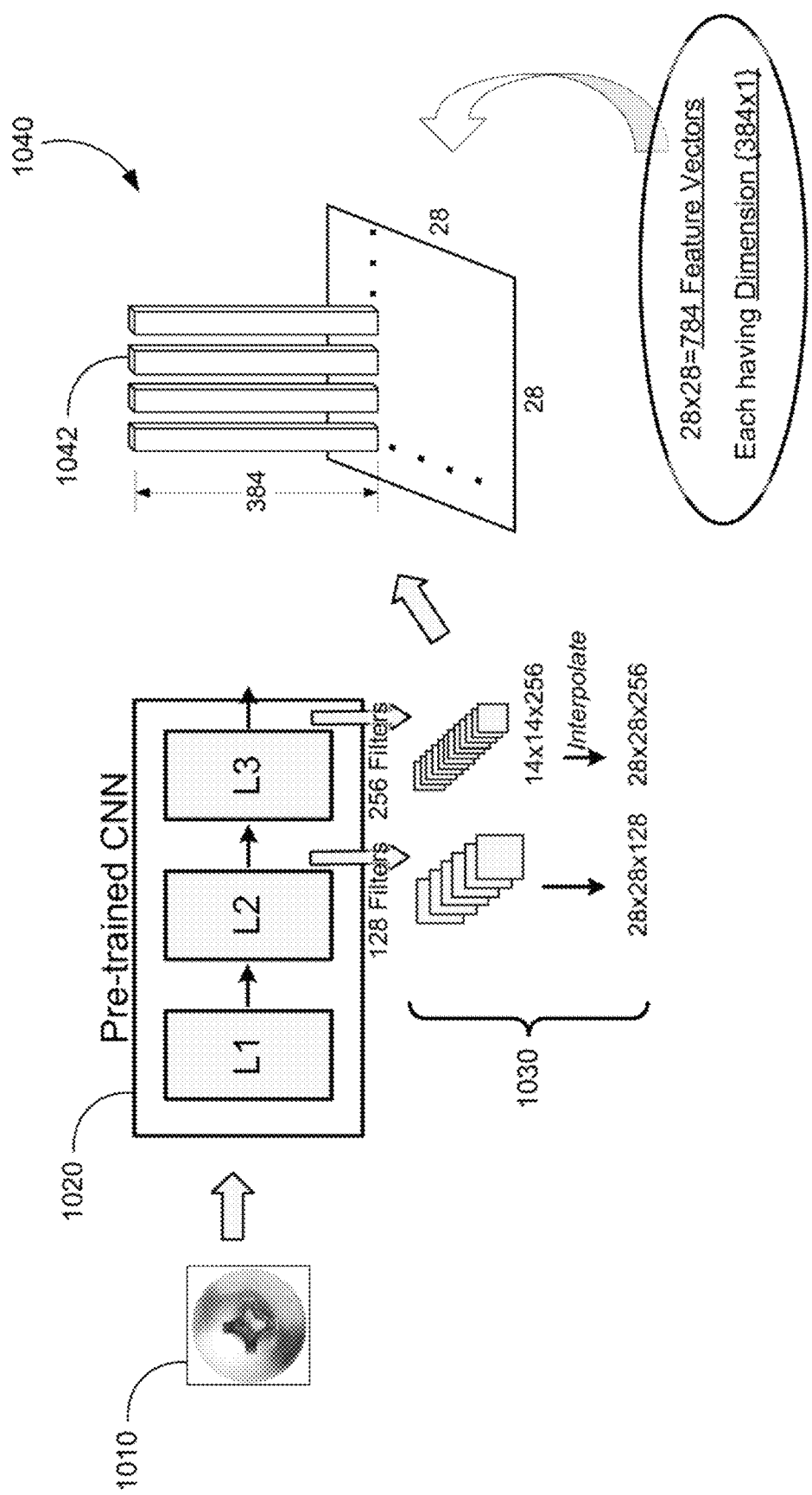
FIG. 10 is a schematic block diagram illustration of a convolutional neural network-based (CNN-based) feature extractor system, as known in the art.

FIG. 10 is a schematic block diagram illustration of a convolutional neural network-based (CNN-based) feature extractor system, as known in the art. Feature extractor modules have been discussed repeatedly in earlier sections of the present disclosure, including being used in the system for anomaly detection using threshold and model adaptation of FIG. 5. FIG. 10 is provided as a basis for discussion of some of the details of feature extractors which are significant in the feature weighting technique described below.

As shown in earlier figures and discussed above, an input image 1010 is provided to a feature extractor module 1020. As understood by those skilled in the art, a convolutional neural network (CNN) is a common architecture used for feature extractor modules, and in fact, pre-trained feature extractor CNNs are available where the network structure is fixed, including the number of layers and the size of each layer output, and the network parameters are trained. The feature extractor module 1020 is one example of such a pre-trained feature extractor CNN. Other examples of feature extractor architecture—having different numbers of layers and feature vectors—may also be used in the presently-disclosed feature weighting anomaly detection technique.

In the example of FIG. 10, the input image 1010 is provided at a certain pixel resolution to the CNN 1020, which includes three layers (L1, L2, L3). Each layer provides an output which is input to a next layer, and/or is provided as usable output from the CNN 1020. In this example, based on the pre-defined structure and training of the CNN 1020, layer L2 contains 128 filters and each filter results in a 28×28 feature map. Layer L3 contains 256 filters and each filter results in a 14×14 feature map. Interpolation converts the L3 output to 28×28 feature maps which matches the size of the output from L2. These feature maps and filter numbers are visually depicted at 1030.

The ultimate output of the CNN 1020, to be used in k-NN anomaly detection, is shown at 1040. The output depicted at 1040 is a 28×28 array of feature vectors 1042, each feature vector having a dimension of {384×1}. The total number of feature vectors is therefore 784 (28×28). The dimension of each feature vector (384) represents the 128 filters from L2 output plus the 256 filters from L3 output. The output depicted at 1040—784 feature vectors, each having 384 filter components—is what is used in the k-NN-based anomaly detection calculations.

Referring back to FIG. 3 and the earlier discussion of feature extraction and anomaly detection, the anomaly score is computed by calculating the distance in vector space between each feature vector for an image and the nearest neighbor in the core set of feature vectors for good images. A smaller average distance for an image's feature vectors results in a smaller anomaly score (more likely a good part), and a larger average distance results in a larger anomaly score (i.e., a bad/anomaly part if the score is above the threshold).

When computing a distance between a feature vector of a part/image currently being assessed and the feature vectors of good parts in a model core set, it is traditional to give all of the vector components equal weight, and compute an unweighted distance between one vector and another vector (where each vector has a dimension of, for example, {384×1}). According to the techniques of the present disclosure, a weight is assigned to each filter component of the vectors being evaluated, and the weighted distance is used. An initial weight value of 1.0 is assigned to each of the 384 filter components, and an iterative optimization process is employed where the anomaly scores are recomputed using a weighted k-NN calculation and a gradient ascent computation adjusts the filter weights to maximize a gap between good and bad part anomaly scores. This technique is discussed in detail with respect to the remaining figures.

Figure 11:
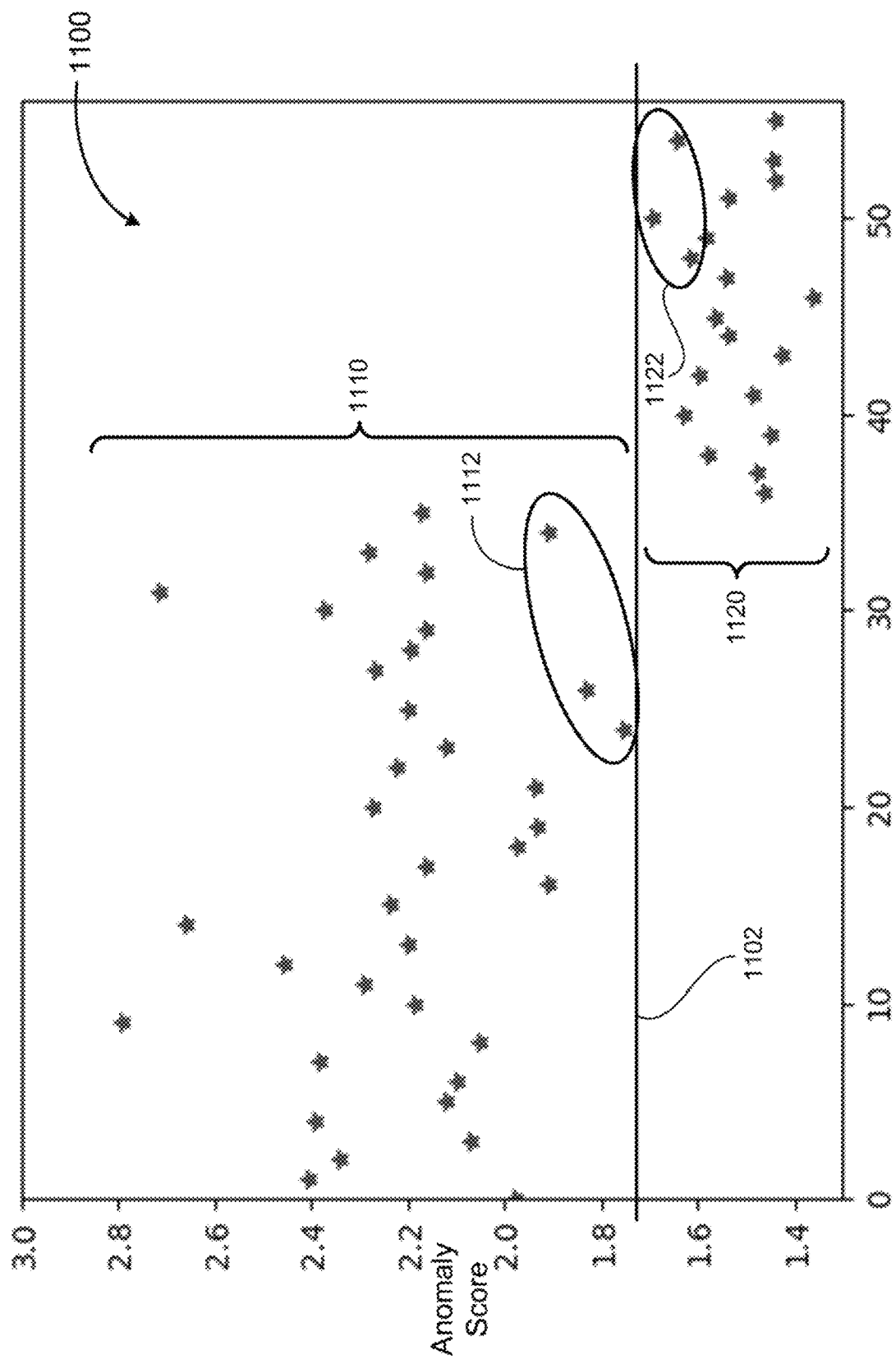
FIG. 11 is a graph of anomaly scores for a plurality of part images, including good parts and bad parts, illustrating a selection of a point set to use in performing a gradient ascent computation for feature weighting, according to embodiments of the present disclosure.

FIG. 11 is a graph 1100 of anomaly scores for a plurality of part images, including good parts and bad parts, illustrating a selection of a point set to use in performing a gradient ascent computation for feature weighting, according to embodiments of the present disclosure. The data points on the graph 1100 are positioned vertically according to the anomaly score for the data point (part image), and positioned horizontally simply according to an image number.

In order to optimize filter weights for anomaly detection, it is necessary to process a plurality of part images at each iteration step. Specifically, a set 1110 contains data points for items (part images) which have been determined (such as through human inspection) to be bad. A set 1120 contains data points for items (part images) which have been determined to be good. A threshold line 1102 may be drawn at an anomaly score value (about 1.75) to distinguish between good and bad parts. Using the threshold line 1102, it can be seen that there are no missed anomaly detections and no false anomaly classifications, but there is very little vertical separation or gap between the good data point set 1120 and the bad data point set 1110. In other words, if the part images were not known in advance to be either good or bad, it would be very difficult to establish a threshold which would reliable classify a part as good or bad based on the anomaly score. The threshold line in this example has a value of about 1.75. In other examples using different images and/or different feature extractors and core sets, the good/bad threshold may have a lower or higher value. The actual value of the threshold is not important to the present discussion; what is important is separation of the anomaly scores of good and bad parts, so that a threshold may be established which reliably distinguishes therebetween.

The objective of the presently-disclosed technique is to increase the separation or gap between the good part anomaly scores and the bad part anomaly scores using an optimization-based feature weighting computation. With the weighting values for the filter components thus optimized, processing of additional images of the same subject matter (e.g., the screw head) realizes the benefit of the increased gap and a resulting anomaly detection performance improvement.

As explained above, it is necessary to process a plurality of part images at each iteration step. In the actual example implementation discussed here and shown on FIG. 11 and later figures, 56 part images were included in a test data set, as may be noted by the scale on the horizontal (image number) axis. This set of 56 images was processed at each iteration of the weighting optimization algorithm discussed below. One other concept illustrated on FIG. 11 relates to the gradient ascent optimization computation. Specifically, the gradient ascent computation is implemented using good and bad test data points which are closest to the threshold line 1102; this provides a sort of leverage for the gradient ascent computation to increase the gap between the anomaly scores of the good parts and the bad parts. In FIG. 11, which is an initial graph of anomaly scores before feature weighting, an ellipse 1112 contains a number of bad data points to be included in a set P, and an ellipse 1122 contains a number of good data points to be included in the set P. The set P is shown in FIG. 11 to include three good data points and three bad data points; however, the number used in individual implementations may be more or less than three, and in fact may be one of each (one good and one bad). Selection and usage of the points in the set P is discussed further below.

Figure 12:
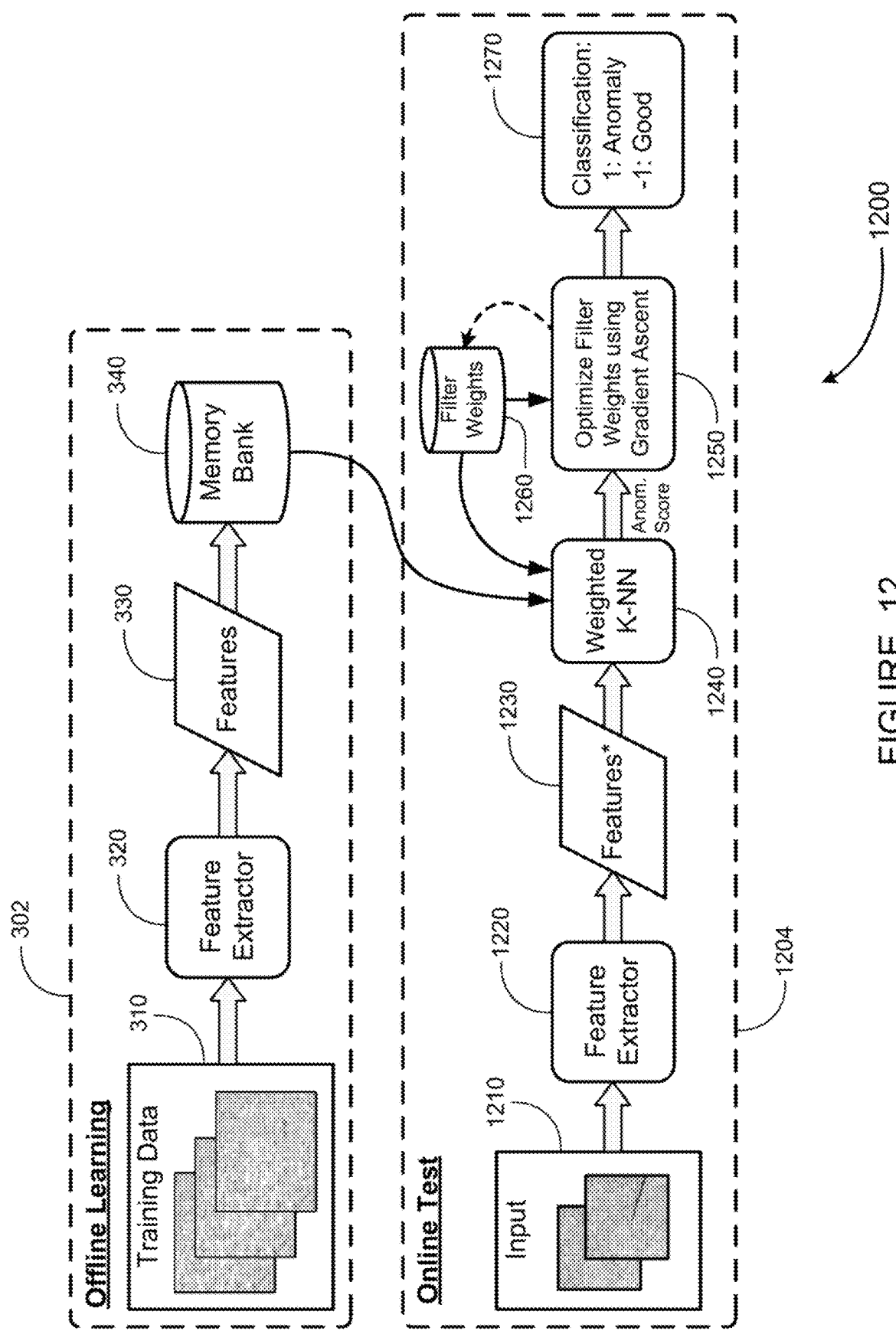
FIG. 12 is a block diagram illustration of a k-NN-based anomaly detection system including feature filter weighting during online test data processing, according to embodiments of the present disclosure.

FIG. 12 is a block diagram illustration of a k-NN-based anomaly detection system 1200 including feature filter weighting during online test data processing, according to embodiments of the present disclosure. The system 1200 has an architecture that is similar to the systems of FIGS. 3 and 5—including an offline learning section and an online test section. The system 1200 includes feature weighting computations coupled with the k-NN anomaly score determination, as described below.

An offline learning section 302 is the same as the offline learning section 302 of FIG. 3, where training data 310 is provided to a feature extractor module 320, and features 330 are included in a memory bank 340. In the system 1200, the training data 310 includes images only for good parts, with no bad/anomaly parts included. This is because the objective is to create the memory bank 340 with a core set of known good feature data, and use the model core set throughout the feature weighting computations.

In an online test section 1204, input 1210 includes a plurality of images from parts of known classification (each part image is labeled as either good or anomaly). In the present example, there are 56 images in the input 1210. Each image from the input 1210 is provided to a feature extractor module 1220, which is the type of CNN-based feature extractor module described earlier with respect to FIG. 10. Features 1230 are provided from the feature extractor module 1220 for each image. Again, the features 1230 in this example include 784 feature vectors for each part image, each feature vector containing 384 filter components. The features 1230 for each of the 56 part images, along with the label for each image (good or bad), are provided to a weighted k-NN module 1240 which determines an anomaly score for each individual part image.

The weighted k-NN module 1240 compares the features 1230 for each part to the model core set from the memory bank 340 which was pre-trained in the offline learning section 302. The anomaly score for each part is determined by the weighted k-NN module 1240 based on the weighted distance (in feature vector space) between the features for the part and the features for the nearest neighbors in the core set of good parts in the memory bank 340. A part with features which closely match the core set (i.e., a very small distance) will have a low anomaly. A part with features which do not closely match the core set (i.e., a large distance) will have a high anomaly score. In the weighted k-NN module 1240, the distances are calculated using a weighting value assigned to each of the 384 filter components. The weighting values are contained in a weight vector w having a size of $\{384 \times 1\}$, and the values in w are all set to 1.0 initially.

A filter weight optimization module 1250 is included in the system 1200. The filter weight optimization module 1250 computes optimal values of the weight vector w in an iterative loop with the k-NN module 1240. The functions performed by the filter weight optimization module 1250 include defining the set P based on the anomaly scores for all of the part images (e.g., 56 scores), performing a gradient ascent computation to calculate new values of the weight vector w, and updating a weight library 1260. The model core set (of good part feature data) is unchanging and is provided from the memory bank 340 to the weighted k-NN module 1240. The updated weight vector w is also provided from the weight library 1260 to the weighted k-NN module 1240, which computes new anomaly scores for all of the part images based on the new filter weights. The iterative weighting optimization loop of the modules 1240 and 1250 continues for a prescribed number of iterations or until it is determined that the weighting values have been optimized. Details of these computations are discussed below in connection with FIG. 13.

A final part classification is provided for each part image at block 1270. The final part classification at the block 1270 is not performed during the iterative weighting optimization loop of the modules 1240 and 1250. However, after the filter weighting values are optimized as discussed above, the online test section 1204 can be used to process part images and perform anomaly detection for unlabeled images (i.e., unknown whether each image is a good or bad part), including final part classification at the block 1270. Using the optimal weighting values, and a threshold assigned with a value located in the gap between good and bad parts, the system 1200 will reliably classify part images with no missed anomaly detections and no false anomaly classifications.

The final classification is typically either a −1 (for a good part) or a 1 (for a bad or anomaly part), although other conventions may be defined. The final classification value is based on the weighted k-NN anomaly score as compared to the threshold, where the weight values used by the weighted k-NN module 1240 to determine the score are optimized in the iterative computation discussed above, and the threshold used to perform the final classification is established based on the score distribution after weighting optimization.

Figure 13:
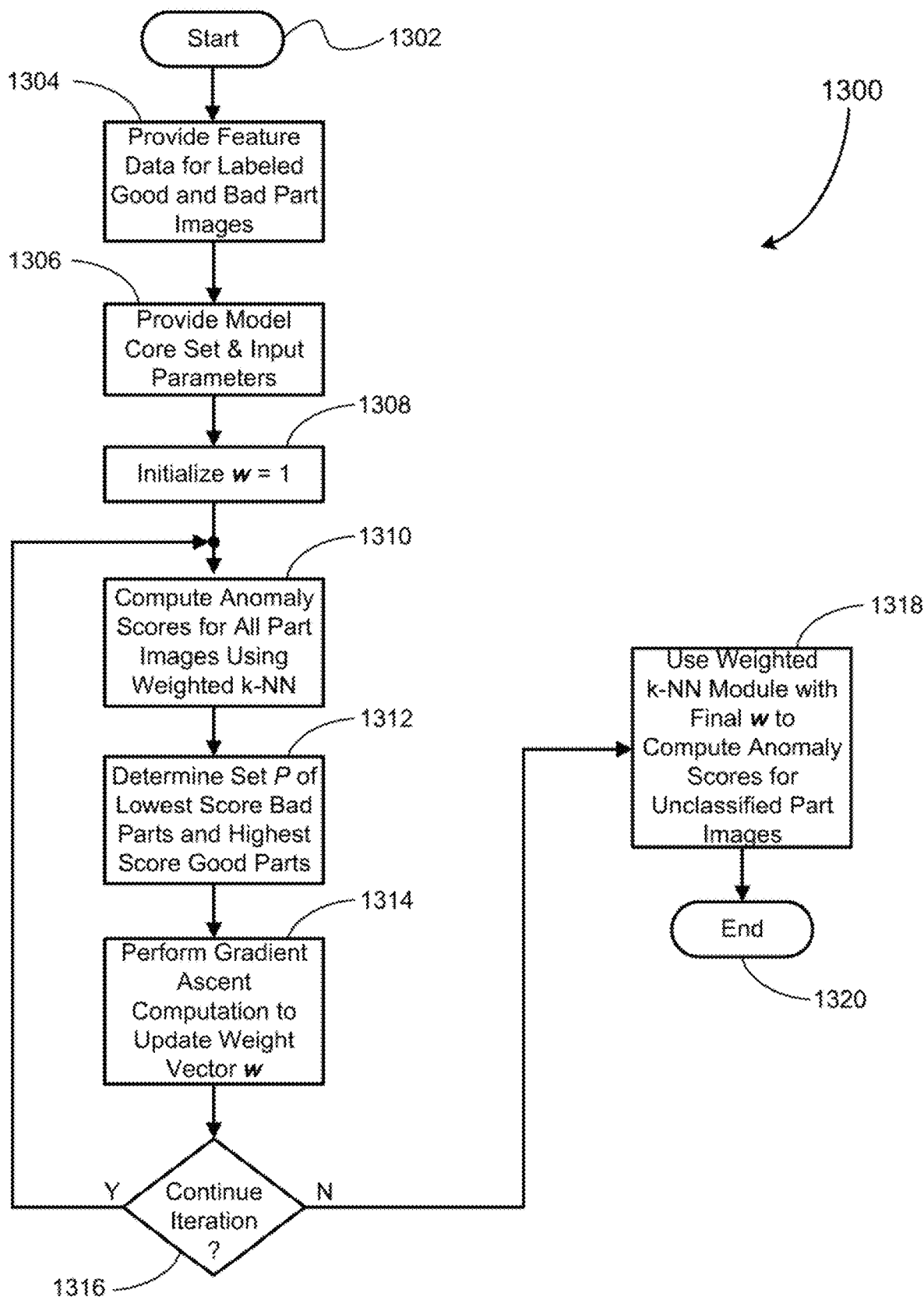
FIG. 13 is a flowchart diagram of a method for feature weighting in a k-NN-based anomaly detection system, according to embodiments of the present disclosure.

FIG. 13 is a flowchart diagram 1300 of a method for feature weighting in a k-NN-based anomaly detection system, according to embodiments of the present disclosure. The method of FIG. 13 is executed in the system 1200 of FIG. 12, and specifically in the online test section 1204, with the iteration steps taking place in the weighted k-NN module 1240 and the filter weight optimization module 1250 in particular.

The process begins at start oval 1302 when the online test section 1204 is used in a training mode. At box 1304, feature data for labeled or classified part images is provided-including images for known good parts and images for known bad parts. In the example discussed above and continued here, 56 part images are provided for training of the anomaly detection system through feature weighting. Of course, more or fewer than 56 part images may be used in the test data set. If a larger number of input test images is needed than the number of part images available, data augmentation may be achieved by horizontally and vertically flipping each available part image. For the purposes of the present discussion of computations, the bad part images (i.e., anomalies or defects) are defined as being included in a defect data set D, and the good part images are defined as being included in a good data set G.

At box 1306, the model core set M of good part feature data from the memory bank 340 is provided, along with certain input parameters. The input parameters needed for the computations include a score function $f$ which determines an anomaly score for a part image using the weighted k-NN computations (based on the feature vector data for the part image, the model core set M and the weight vector w), a label y which is defined as having a value of 1 for defect part images and −1 for good part images, a function g which is defined by g=yf (that is, the value of g is the value of the anomaly score from $f$ for defect parts, and the value of g is the negative of the value of the anomaly score from $f$ for good parts), and a learning rate factor $\alpha$.

At box 1308, the weight vector w is initialized at a value of 1 (i.e., all 384 filter weights are set to 1). At box 1310, anomaly scores for all part images are computed using the weighted k-NN computation. In the current example, all 56 part images, some of which are in the defect data set D and some of which are in the good data set G, are analyzed to determine an anomaly score using the score function $f$. The first time that the box 1310 is executed, the filter weights in the vector w all have a value of 1; in later execution of the box 1310, the filter weights in the vector w all have different values. Following execution of the box 1310, all of the parts in the test data set have an anomaly score, which is the situation which was depicted in FIG. 11 and discussed earlier.

At box 1312, the set P of points is determined. As discussed earlier and shown on FIG. 11, the set P includes one or more of the good data points having the highest anomaly score and one or more of the bad data points having the lowest anomaly score. The particular data points contained in the set P may change from one iteration to the next, because every data point (part image) gets a new anomaly score after every update of the weight vector w. Following is an example of a calculation which may be used in the box 1312 to determine the points in the set P:

$$P = \{\mathrm{argmin}_{x \in D} f(x, M, w), \mathrm{argmax}_{x \in G} f(x, M, w)\} \quad (2)$$

Where Equation (2) reads as follows; find the point(s) x among the elements of the defect data set D which have a minimum value of the score function $f$; and find the point(s) x among the elements of the good data set G which have a maximum value of the score function $f$. In Equation (2), the "points" are individual identified part images (e.g., #1-56) defined by their extracted feature vectors, and the score function $f$ is evaluated from the feature vectors of x, the model core set M and the weight vector w.

At box 1314, a gradient ascent computation is performed to update the individual filter weight values in the weight vector w. As known in the art, gradient ascent is an iterative technique which may be used to evaluate the effect of a set of input variables on a value of a function, and follow the gradient to maximize the function. In this case, the gradient ascent calculation performed at the box 1314 is defined as:

$$w = w + \alpha \nabla g|_{at\ P} \quad (3)$$

Where Equation (3) updates the weight vector w by adding a term which is the learning rate factor $\alpha$ multiplied by a gradient $\nabla$ of the function g evaluated at the point set P. It will be recalled that the value of g is the value of the anomaly score from $f$ for defect parts, and the value of g is the negative of the value of the anomaly score from $f$ for good parts. Thus, the value of the function g is greatest when the anomaly scores of defect parts in P is higher and the anomaly scores of good parts in P is lower. At each iteration, a local value of the gradient $\nabla$ is established, and following iterations will use the value of the gradient to calculate a next iteration of the weight vector w according to Equation (3). The result is that the weight vector w is updated in the direction of positive gradient, and ultimately an optimal weight vector w is found which maximizes g.

At decision diamond 1316, it is determined whether to continue iteration. The iteration continues until either the gradient converges to a predefined convergence criteria or a predefined maximum number of iterations is reached. The convergence criteria and the maximum number of iterations may be provided among the input parameters at the box 1306. When iteration continues at the decision diamond 1316, the process loops back to the box 1310 where the anomaly scores for all parts are recomputed using the updated weight vector w. This is followed by a determination of a new set P and a new gradient ascent computation, and so on.

When iteration concludes at the decision diamond 1316, an optimal weight vector w has been found (or may be found by analyzing the data for all iterations) for separating and distinguishing good parts from bad parts in the test data set. This means that the system 1200 of FIG. 12 is now trained to perform anomaly detection and produce the desired results. Thus, at box 1318 of FIG. 13, the weighted k-NN module 1240 is used with the final (optimal) weight vector w to perform anomaly detection in a "production" mode where the input part images have not been classified as good vs. bad. As long as the input part images in the production mode are of the same subject (such as the screw heads of FIG. 2) as the test images used for training, the system 1200 will accurately perform anomaly detection on unclassified part images. The process ends at terminus 1320.

The preceding discussion of FIG. 13 describes a number of evaluations and calculations performed in the process of feature filter weighting. With reference to the system block diagram of FIG. 12, it is to be understood that the various blocks and modules are all embodied in algorithms running on a processor (or multiple processors in communication with each other) such that the necessary data is available to each of the computing modules as needed for feature extraction, k-NN scoring, weight vector optimization, etc. This is visually depicted with the arrows in FIG. 12.

Figure 14:
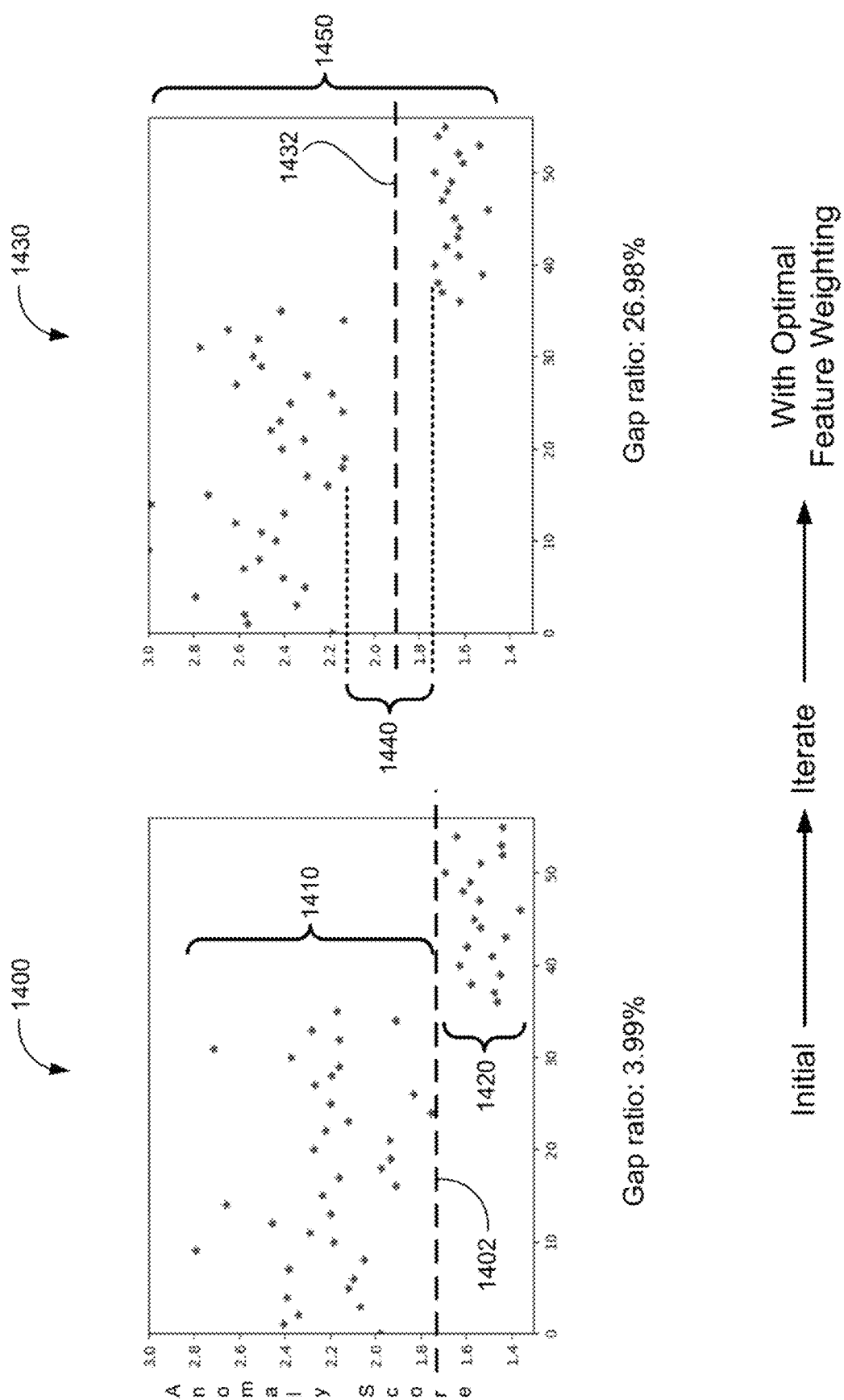
FIG. 14 is a pair of graphs of anomaly scores for a plurality of part images, including good parts and bad parts, illustrating a gap ratio improvement resulting from the feature weighting method of FIG. 13, according to embodiments of the present disclosure.

FIG. 14 is a pair of graphs of anomaly scores for a plurality of part images, including good parts and bad parts, illustrating a gap ratio improvement resulting from the feature weighting method of FIG. 13, according to embodiments of the present disclosure. A graph 1400 at left displays the initial anomaly scores for the 56 test part images discussed above. As explained earlier, the test part images are grouped into a set of bad (anomaly or defect) parts 1410 and a set of good parts 1420. The anomaly scores are from an actual experiment in the initial condition where all of the filter weights are set to a value of 1, which corresponds to the first iteration in the flowchart diagram 1300 of FIG. 13. A threshold line 1402 can be drawn which divides the set of bad parts 1410 from the set of good parts 1420, but there is very little separation between the sets.

A graph 1430 at right displays the anomaly scores for the test part images when feature weighting is performed using the optimal weight vector w found using the method of FIG. 13. A threshold line 1432 can be drawn which divides the set of bad parts 1410 from the set of good parts 1420, and it can be seen that there is a much greater separation between the sets. A gap 1440 is defined as the difference in anomaly score between the lowest scoring bad part and the highest scoring good part. A range 1450 is defined as the difference between the highest and lowest overall scores. A gap ratio is then defined as the gap 1440 divided by the range 1450.

In the first iteration (initial, with all feature filter weights set to 1), the gap ratio in the experiment was 3.99%. In the iteration with the optimal weight vector w, the gap ratio was 26.98%. This dramatic increase in the gap ratio—visually witnessed by the difference in separation between the graphs 1400 and 1430—clearly demonstrates the effectiveness of the disclosed feature weighting technique for k-NN-based anomaly detection. It is also noted that increasing the gradient of the function g at P ($\nabla g|_{at\ P}$) has a mathematical meaning which is analogous to increasing the gap ratio as illustrated in FIG. 14.

Figure 15:
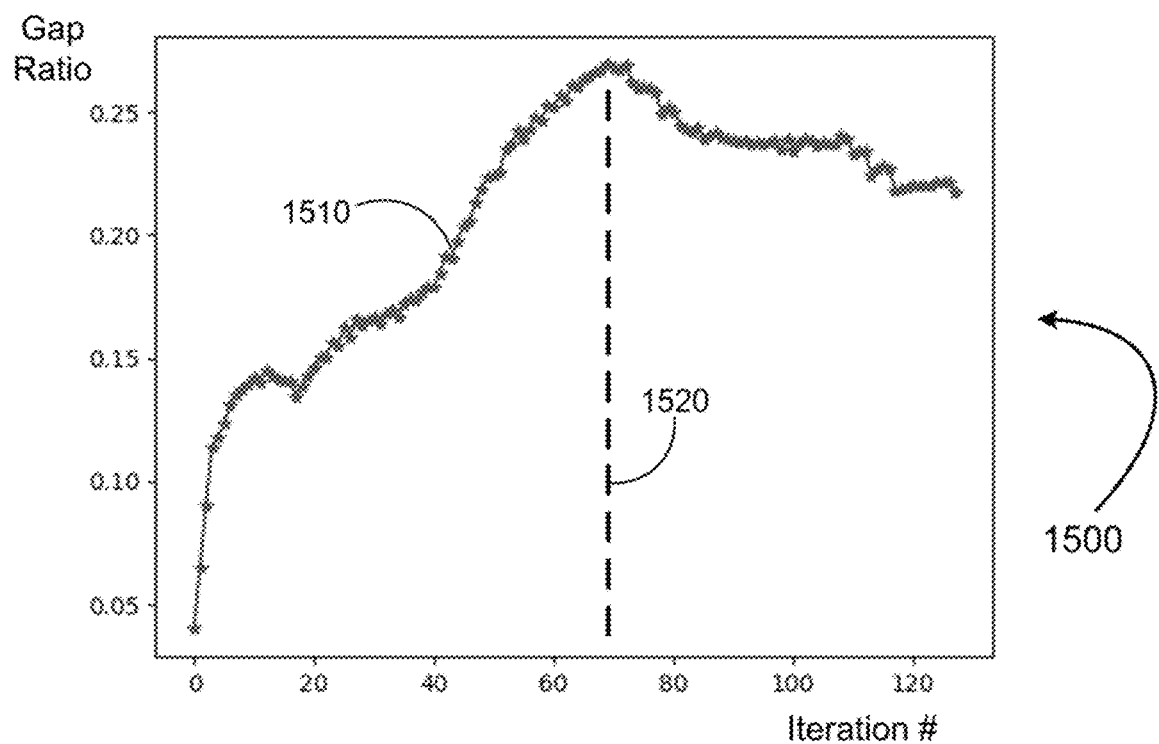
FIG. 15 is a graph of a gap ratio between good and bad parts plotted against iteration number, resulting from the feature weighting method of FIG. 13, according to embodiments of the present disclosure.

FIG. 15 is a graph 1500 of a gap ratio between good and bad parts plotted against iteration number, resulting from the feature weighting method of FIG. 13, according to embodiments of the present disclosure. A trace 1510 plots the gap ratio for each iteration. It can be seen that the gap ratio increases dramatically at the beginning, peaks after about 70 iterations, and then declines and meanders around after that. This is the nature of the gradient ascent method, which will continue to search around in the feasible state space to see if a better optimum can be found.

A line 1520 is drawn at the iteration number where the peak gap ratio was realized. This peak gap ratio corresponds with the graph 1430 of FIG. 14. As mentioned earlier, the iteration of the method of FIG. 13 may be allowed to continue for a sufficiently large number of iterations and then the maximum gap ratio identified after all of the iterations (as depicted in FIG. 15), or the iteration may be concluded when a convergence criteria is met. The convergence criteria may be defined in terms of improvement over a successive set of iterations in order to avoid premature termination at a local maximum such as the one seen at about iteration number 10 in FIG. 15.

Figure 16:
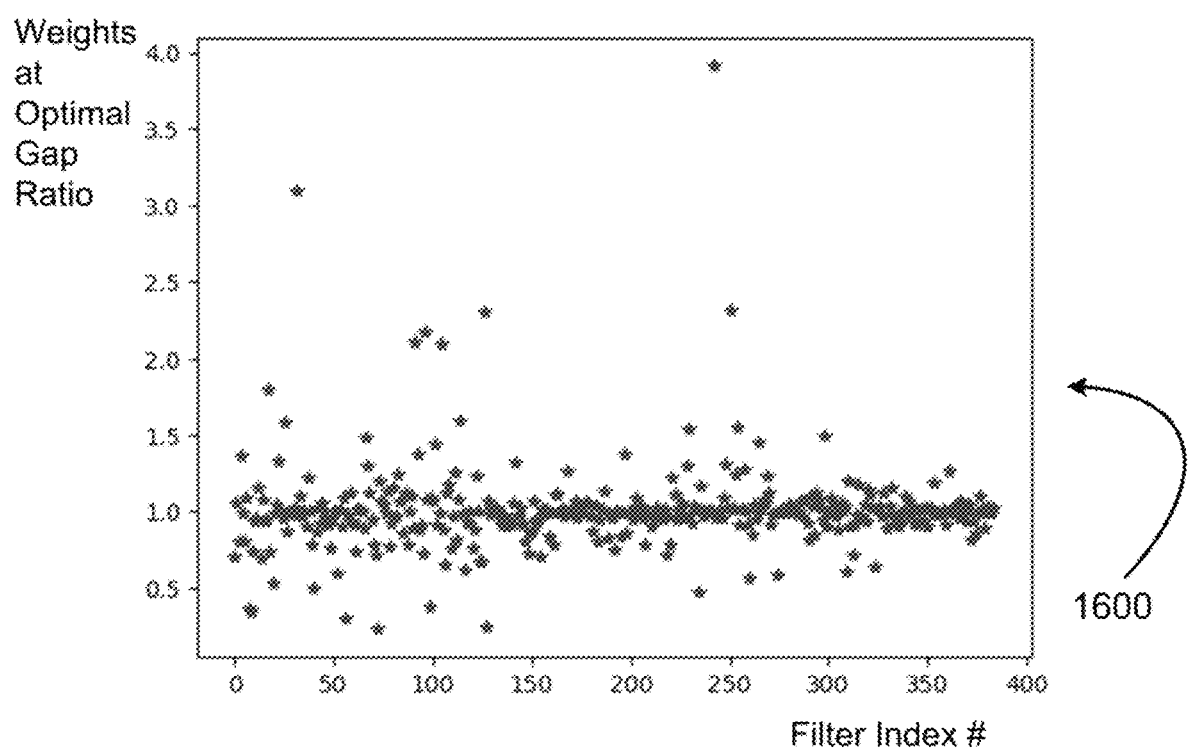
FIG. 16 is a graph of filter weights at an optimal iteration number from FIG. 15, resulting from the feature weighting method of FIG. 13, according to embodiments of the present disclosure.

FIG. 16 is a graph 1600 of filter weights at the optimal iteration number from FIG. 15, resulting from the feature weighting method of FIG. 13, according to embodiments of the present disclosure. FIG. 16 plots the individual filter weight values for each of the 384 filter components in the weight vector w. Recall that all of the filter weights were initially set to a value of 1. After gradient ascent optimization of the weight vector w, it can be seen that most of the individual filter weights remain fairly close in value to 1, but some are significantly higher than 1 and some are significantly lower than 1. This distribution of filter weights demonstrates the power of the disclosed techniques. That is, using feature vectors extracted from part images of a certain subject matter, a weighted k-NN anomaly scoring calculation in conjunction with a gradient ascent filter weight optimization computation provide a system which is trained to deliver accurate anomaly detection results. Filter weighting is an effective means of separating good part images from bad part images of the subject matter, and FIG. 16 demonstrates that it would be impossible to effectively select the individual filter weight values in any manual method. Selection of filter weights one at a time is also ineffective because of the interdependencies of the hundreds of filter weights in calculating feature vector distances.

Tests of an anomaly detection system trained using feature filter weighting as described above yielded the desired anomaly detection results characteristics in recall (no missed anomaly detections) and in precision (no false anomaly classifications).

Throughout the preceding discussion, various computers are described and implied. It is to be understood that the software applications and modules of these computers are executed on one or more computing devices having a processor and a memory module. In particular, this includes computer(s) with processor(s) configured with algorithms performing the functions of the blocks in FIGS. 5 and 12, where the computer(s) may be in communication with an imaging system (e.g., camera) which provides the input images, and other input/output devices as needed to effect a fully automated system.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for adaptive anomaly detection, said method comprising:

providing an input data set including a plurality of good part images and a plurality of anomaly part images;

performing a feature extraction on an image in the input data set to produce feature vector data;

determining an anomaly score for the image, using a k-nearest neighbors (k-NN) algorithm running on a computer having a processor and memory, including comparing the feature vector data to a model core set containing feature vectors of good part images;

when the anomaly score is greater than a threshold, performing a human inspection of the image;

updating an anomaly library with the feature vector data for the image when the inspection determines that the image is a true anomaly;

adapting the model core set when the inspection determines that the image is a false anomaly, including replacing a feature vector in the model core set with a feature vector in the feature vector data when predefined relative distance criteria are met;

computing a new value for the threshold after adapting the model core set; and performing a feature extraction on a next image in the input data set.

2. The method according to claim 1 further comprising, after adapting the model core set and computing a new value for the threshold, performing anomaly detection on a test data set including a plurality of good part images and a plurality of anomaly part images.

3. The method according to claim 2 wherein performing anomaly detection on a test data set includes computing an anomaly score, using the k-NN algorithm, for each of the images in the test data set and comparing the anomaly score to a known good or anomaly classification of each of the images to determine a performance score for a current adaptation of the model core set and the threshold.

4. The method according to claim 1 wherein a good part image is an image of a part determined to have acceptable quality and a bad part image is an image of a part determined to have unacceptable quality.

5. The method according to claim 1 wherein the model core set is initially created by including feature vectors from images in a training data set comprising a plurality of good part images.

6. The method according to claim 1 wherein determining an anomaly score for the image using a k-NN algorithm includes computing a distance from each feature vector in the feature vector data to feature vectors in the model core set, identifying a minimum distance to a nearest neighbor core set feature vector, and determining the anomaly score based on the minimum distance.

7. The method according to claim 6 wherein the feature extractor extracts a plurality of feature vectors for each of the images, each feature vector includes a plurality of component values, and the distance is calculated in vector space based on differences between corresponding component values.

8. The method according to claim 1 wherein adapting the model core set includes replacing a feature vector in the model core set with a feature vector in the feature vector data when a distance from the feature vector in the feature vector data to a nearest feature vector in the model core set is greater than a distance between a nearest neighbor pair of feature vectors in the model core set.

9. The method according to claim 8 wherein one of the feature vectors of the nearest neighbor pair is removed from the model core set and the feature vector in the feature vector data is added to the model core set.

10. The method according to claim 1 wherein computing a new value for the threshold includes re-computing the anomaly score for the image after adapting the model core set, computing an upper bound for the threshold using the model core set after adaptation and the anomaly library, and computing the new value of the threshold as the larger of an old value of the threshold and the recomputed anomaly score, plus an increment term, and capped to be no greater than the upper bound.

11. The method according to claim 1 further comprising, after processing all of the images in the input data set, using the k-NN algorithm with a final model core set to compute anomaly scores for images of production parts of unknown good or anomaly classification, accepting parts with anomaly scores below a final threshold, and rejecting parts with anomaly scores above the final threshold.

12. A method for adaptive anomaly detection, said method comprising:
  creating a model core set including feature vectors from images in a training data set comprising a plurality of good part images, where a good part image is an image of a part having acceptable quality;
  providing an input data set including a plurality of good part images and a plurality of anomaly part images, where an anomaly part image is an image of a part having unacceptable quality;
  performing a feature extraction on an image in the input data set to produce feature vector data;
  determining an anomaly score for the image, using a k-nearest neighbors (k-NN) algorithm running on a computer having a processor and memory, including comparing the feature vector data to the model core set;
  when the anomaly score is greater than a threshold, performing a human inspection of the image;
  updating an anomaly library with the feature vector data for the image when the inspection determines that the image is a true anomaly;
  adapting the model core set when the inspection determines that the image is a false anomaly, including replacing a feature vector in the model core set with a feature vector in the feature vector data when predefined relative distance criteria are met;
  computing a new value for the threshold after adapting the model core set;
  performing anomaly detection on a test data set including a plurality of good part images and a plurality of anomaly part images to determine a performance score for a current adaptation of the model core set and the threshold;
  performing a feature extraction on a next image in the input data set; and
  after processing all of the images in the input data set, using the k-NN algorithm with a final model core set to compute anomaly scores for images of production parts of unknown good or anomaly classification, accepting parts with anomaly scores below a final threshold, and rejecting parts with anomaly scores above the final threshold.

13. The method according to claim 12 wherein adapting the model core set includes, when a distance from a feature vector in the feature vector data to a nearest feature vector in the model core set is greater than a distance between a nearest neighbor pair of feature vectors in the model core set, removing one of the feature vectors of the nearest neighbor pair from the model core set and adding the feature vector in the feature vector data to the model core set.

14. The method according to claim 12 wherein computing a new value for the threshold includes re-computing the anomaly score for the image after adapting the model core set, computing an upper bound for the threshold using the model core set after adaptation and the anomaly library, and computing the new value of the threshold as the larger of an old value of the threshold and the recomputed anomaly score, plus an increment term, and capped to be no greater than the upper bound.

15. An adaptive anomaly detection system, said system comprising:
  a computer having a processor and memory configured with;
  a feature extractor module which extracts feature vectors from images in a training data set comprising a plurality of good part images, where the feature vectors from the training data set are used to create a model core set;
  a k-nearest neighbors (k-NN) algorithm; and
  an adaptation module,
  where an input data set including a plurality of good part images and a plurality of anomaly part images is provided to the feature extractor module,
  the feature extractor module performs a feature extraction on an image in the input data set to produce feature vector data,
  the k-NN algorithm determines an anomaly score for the image, including comparing the feature vector data to the model core set,
  the adaptation module updates an anomaly library with the feature vector data for the image when the anomaly score is greater than a threshold and a human inspection determines that the image is a true anomaly,
  the adaptation module adapts the model core set when the anomaly score is less than the threshold and the human inspection determines that the image is a false anomaly, including replacing a feature vector in the model core set with a feature vector in the feature vector data when predefined relative distance criteria are met,
  the adaptation module computes a new value for the threshold after adapting the model core set, and
  the feature extractor module performs a feature extraction on a next image in the input data set.

16. The system according to claim 15 wherein adapting the model core set includes, when a distance from a feature vector in the feature vector data to a nearest feature vector in the model core set is greater than a distance between a nearest neighbor pair of feature vectors in the model core set, removing one of the feature vectors of the nearest neighbor pair from the model core set and adding the feature vector in the feature vector data to the model core set.

17. The system according to claim 16 wherein the feature vector data includes a plurality of feature vectors for each of the images, each feature vector includes a plurality of component values, and the distance is calculated in vector space based on differences between corresponding component values.

18. The system according to claim 15 wherein computing a new value for the threshold includes re-computing the anomaly score for the image after adapting the model core set, computing an upper bound for the threshold using the model core set after adaptation and the anomaly library, and computing the new value of the threshold as the larger of an old value of the threshold and the recomputed anomaly score, plus an increment term, and capped to be no greater than the upper bound.

19. The system according to claim 15 wherein the k-NN algorithm determines an anomaly score for the image by computing a distance from each feature vector in the feature vector data to feature vectors in the model core set, identifying a minimum distance to a nearest neighbor core set feature vector, and determining the anomaly score based on the minimum distance.

20. The system according to claim 15 wherein, after processing all of the images in the input data set, the k-NN algorithm uses a final model core set to compute anomaly scores for images of production parts of unknown good or anomaly classification, where parts with anomaly scores below a final threshold are accepted, and parts with anomaly scores above the final threshold are rejected.

\* \* \* \* \*